(12) United States Patent
Tanabe et al.

(10) Patent No.: US 9,870,654 B2
(45) Date of Patent: Jan. 16, 2018

(54) GROUND WORK VEHICLE, GROUND WORK VEHICLE MANAGEMENT SYSTEM, AND GROUND WORK INFORMATION DISPLAY METHOD

(71) Applicant: Kubota Corporation, Naniwa-ku, Osaka-shi, Osaka (JP)

(72) Inventors: Aya Tanabe, Sakai (JP); Kazuhiro Takahara, Sakai (JP); Kazunori Matsufuji, Sakai (JP); Hirotsugu Inoue, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/468,643

(22) Filed: Mar. 24, 2017

(65) Prior Publication Data

US 2017/0200332 A1 Jul. 13, 2017

Related U.S. Application Data

(62) Division of application No. 14/429,982, filed as application No. PCT/JP2013/074252 on Sep. 9, 2013, now Pat. No. 9,639,998.

(30) Foreign Application Priority Data

Sep. 26, 2012 (JP) .................................. 2012213254
Mar. 26, 2013 (JP) .................................. 2013064834

(51) Int. Cl.
*G06F 19/00* (2011.01)
*G07C 5/08* (2006.01)
(Continued)

(52) U.S. Cl.
CPC ......... *G07C 5/0825* (2013.01); *A01D 41/127* (2013.01); *B60K 35/00* (2013.01);
(Continued)

(58) Field of Classification Search
CPC ............................ G07C 5/0825; A01D 41/127
See application file for complete search history.

(56) References Cited

U.S. PATENT DOCUMENTS 5,666,793 A 9/1997 Bottinger
6,167,337 A 12/2000 Haack et al.
(Continued)

FOREIGN PATENT DOCUMENTS

CN 101292572 A 10/2008
CN 102379189 A 3/2012
(Continued)

*Primary Examiner* — Adam Alharbi
(74) *Attorney, Agent, or Firm* — The Webb Law Firm

(57) ABSTRACT

A work device that performs work using a work unit while traveling, or a management system in which the work device is incorporated includes: a travel information generation unit that, over time, generates travel information indicating a travel state; a work information generation unit that, over time, generates work information indicating a work state for the work unit; a travel evaluation unit that, based on the travel information and the work information, divides the traveling of the work device into non-work traveling and actual work traveling; and a data visualization unit that generates visual data according to which the result of the division performed by the travel evaluation unit is made visible.

12 Claims, 13 Drawing Sheets

(51) Int. Cl.

| | | |
|---|---|---|
| *A01D 41/127* | (2006.01) | |
| *E02F 9/26* | (2006.01) | |
| *F02D 29/02* | (2006.01) | |
| *G07C 5/00* | (2006.01) | |
| *G08G 1/00* | (2006.01) | |
| *G01S 19/14* | (2010.01) | |
| *B60K 35/00* | (2006.01) | |
| *G06F 3/14* | (2006.01) | |
| *H04L 29/08* | (2006.01) | |

(52) U.S. Cl.
CPC ............... *E02F 9/26* (2013.01); *F02D 29/02* (2013.01); *G01S 19/14* (2013.01); *G06F 3/1423* (2013.01); *G07C 5/00* (2013.01); *G07C 5/008* (2013.01); *G08G 1/00* (2013.01); *H04L 67/12* (2013.01)

(56) References Cited

U.S. PATENT DOCUMENTS

| | | | |
|---|---|---|---|
| 6,343,238 | B1 | 1/2002 | Kudo |
| 7,283,810 | B1 | 10/2007 | Arakawa et al. |
| 2007/0089390 | A1 | 4/2007 | Hendrickson et al. |
| 2009/0307042 | A1 | 12/2009 | Sunagawa |
| 2014/0018056 | A1 | 1/2014 | Miyake et al. |
| 2015/0351320 | A1* | 12/2015 | Takahara ............... A01B 76/00 701/50 |
| 2016/0073275 | A1* | 3/2016 | Inoue ..................... E02F 9/264 455/41.2 |

FOREIGN PATENT DOCUMENTS

| | | | |
|---|---|---|---|
| JP | 644387 | A | 2/1994 |
| JP | 6233609 | A | 8/1994 |
| JP | 10313668 | A | 12/1998 |
| JP | 11032550 | A | 2/1999 |
| JP | 11296208 | A | 10/1999 |
| JP | 2002187698 | A | 7/2002 |
| JP | 200333110 | A | 2/2003 |
| JP | 2003289712 | A | 10/2003 |
| JP | 2004139469 | A | 5/2004 |
| JP | 2004213239 | A | 7/2004 |
| JP | 2004248621 | A | 9/2004 |
| JP | 2004283129 | A | 10/2004 |
| JP | 2008222179 | A | 9/2008 |
| JP | 2009163637 | A | 7/2009 |
| JP | 2010104292 | A | 5/2010 |
| JP | 2010188961 | A | 9/2010 |
| JP | 2010217944 | A | 9/2010 |
| JP | 2011095941 | A | 5/2011 |
| JP | 2011155938 | A | 8/2011 |
| JP | 2011166290 | A | 8/2011 |
| JP | 2011221620 | A | 11/2011 |
| JP | 2012213141 | A | 11/2012 |

\* cited by examiner

Fig.7

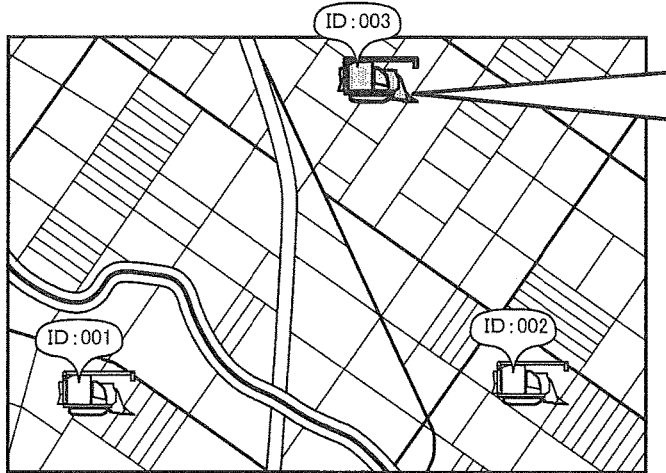

| Device number | Combine 2 |
|---|---|
| Device position information | Current location |
| Worker information | Taro Kubota |
| Status | Working |
| Hour meter | 521 hours |
| Fuel consumption amount | 80L |
| Fuel cost | 8,000 yen |
| Remaining fuel amount | 20L |
| Work time | 6 hours, 30 minutes |
| Work area | 0  250a  300 |
| Engine set rotation speed | 2600rpm |
| Maximum water temperature | C  100°C  H |
| Average work speed | 0  1.5m/s  2.0 |
| Work efficiency level | ■■■■■■□□□ |

Fig.8

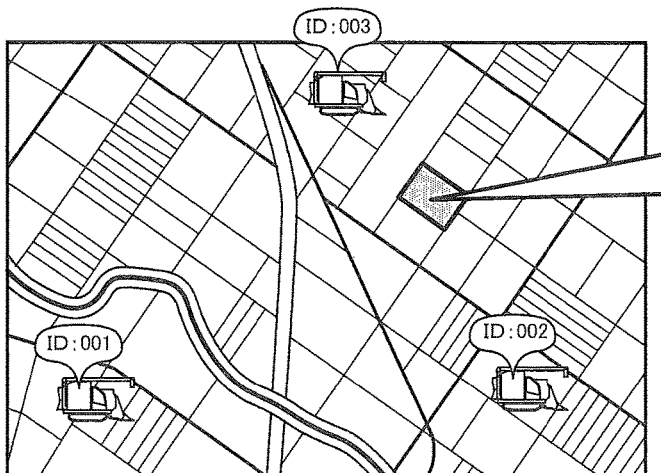

| Agricultural land name | ZZZ |
|---|---|
| Area | 19.6a |
| Crop | Koshihikari rice |
| Work progress | Harvesting complete |
| Dehulled rice harvest amount | 8.7 bags / 10 acres |
| Average protein | 5.94% |
| Average moisture | 21.2% |
| Fertilizer | |
| Agricultural chemicals | |
| Fuel consumed | 10L  140 yen |
| Work time | 45 minutes |
| Engine set rotation speed | 2600rpm |
| Maximum water temperature | C  100°C  H |
| Average work speed | 0  1.5m/s  2.0 |

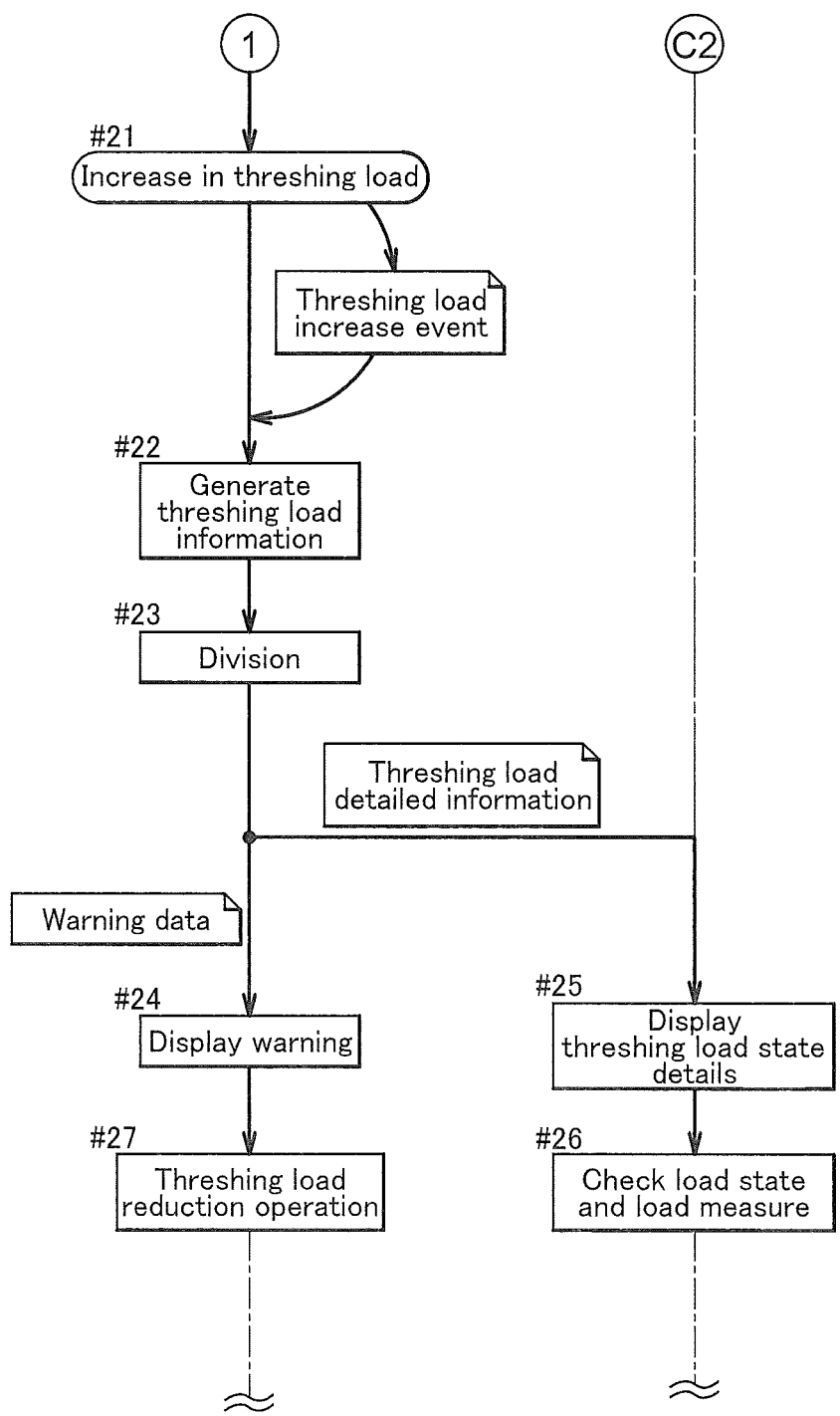

GROUND WORK VEHICLE, GROUND WORK VEHICLE MANAGEMENT SYSTEM, AND GROUND WORK INFORMATION DISPLAY METHOD

CROSS-REFERENCE TO RELATED APPLICATIONS

This application is a divisional of U.S. patent application Ser. No. 14/429,982, filed Mar. 20, 2015, which is the United States national phase of International Application No. PCT/JP2013/074252 filed Sep. 9, 2013, and claims priority to Japanese Patent Application Nos. 2012-213254 and 2013-064834 filed Sep. 26, 2012 and Mar. 26, 2013, respectively, the disclosures of which are hereby incorporated in their entireties by reference.

TECHNICAL FIELD OF THE INVENTION

The present invention relates to a ground work vehicle configured to perform work using a work apparatus while traveling, and an information management technique for a ground work vehicle. This information management technique includes linking between a display of a mobile communication terminal brought inside of a ground work vehicle and a vehicle-mounted display.

BACKGROUND OF THE INVENTION

There are known to be ground work vehicle management systems in which drive state data of a ground work vehicle is transmitted to a maintenance management center via a network and the drive state data are accumulated at the maintenance management center. For example, with a network-type agricultural machine system disclosed in Patent Document 1, an agricultural machine includes a sensor that detects an operation state of an agricultural machine, a transmission means for transmitting data regarding the detected operation state in addition to machine identification information unique to the agricultural machine, a position information acquisition means for acquiring position information of the agricultural machine, and an abnormal state reporting button for reporting when an abnormality occurs in the agricultural machine. A maintenance management center is provided with a reception means for receiving operation state data transmitted from the agricultural machine, and a data accumulation means for classifying the received operation state data for each agricultural machine based on the machine identification information and accumulating it in a database. Furthermore, the agricultural machine includes an abnormal state reporting processing means for, in the case where the abnormal state reporting button is pressed, transmitting operation state data accumulated up to a predetermined time before the button was pressed, along with the position information and the device identification information to the maintenance management center as abnormal state reporting data. At that time, work clutch engagement/disengagement operation data, calculation data regarding travel distance and work time or work distance since a work clutch engagement/disengagement operation data, calculation data regarding a harvest amount based on tank signal data, data regarding the rotation speed, threshing data and the like are treated as driving state data. With this network-type agricultural machine system, the operation state data from when an abnormality occurs and until a certain time is transmitted as abnormal state reporting data along with the machine identification information of the agricultural machine in which the abnormal state occurred, as well as the position information of the agricultural vehicle. Therefore, based on these pieces of information, a serviceman can know the exact status of the agricultural machine. However, with this network-type agricultural machine system, the maintenance management center only has a function of transmitting the accumulated drive state data in response to the occurrence of an abnormality in the agricultural machines, and does not have a data processing function according to which such accumulated drive state data are used for work evaluation.

Also, from Patent Document 2, there is known to be an agricultural work vehicle management apparatus that divides agricultural land into plots and records the work performed by the agricultural work vehicle in units of plots. With this management device, a work management terminal device that can communicate with a controller for a work vehicle includes a DVD (Digital Versatile Disc) reading apparatus that stores map data, a GPS (Global Positioning System) receiver, and a gyro sensor, and obtains the outline of the agricultural land from the map data. The obtained map data of the work location is divided into plots, and local information (existence of hindrances such as utility poles) is stored. For example, if the agricultural work vehicle is a combine, the total discharge amount of unhulled rice obtained by harvesting work is input as the harvest amount of the entire field. Also, if the agricultural work vehicle is a tractor, a tilling depth sensor detection value obtained during tilling work is automatically recorded as the tilling depth value in each field plot. In this management apparatus as well, local information of the agricultural land and the harvest amount of an agricultural product are dealt with, but information indicating the operation status of the work apparatus of the agricultural work vehicle is not dealt with.

Also, from Patent Document 3, there is known to be a combine in which a detection apparatus that detects grain quality is mounted and a combine drive state that is to be employed is reported based on the result of detection performed by the detection apparatus. Specifically, the combine is configured to display an optimal threshing value based on the result of detecting the moisture content of the grains, and based on that, an operator can adjust the driving speed of a threshing cylinder and the like. In this combine as well, information indicating the driving states of various work apparatuses during harvesting work is not dealt with.

The following conventional technique is known as a technique for linking the display of a mobile communication terminal, which has been brought inside of a ground work vehicle having a vehicle-mounted display that displays information, and the vehicle-mounted display.

From Patent Document 4, there is known to be an in-vehicle communication system according to which a mobile information terminal brought inside of a vehicle and a vehicle-mounted apparatus with a display function are connected and the mobile information terminal and the vehicle-mounted apparatus are used more efficiently. The in-vehicle communication system includes an in-cabin display apparatus provided in the vehicle, and an in-cabin communication relay apparatus that relays communication between the in-cabin display apparatus provided in the vehicle and a mobile information terminal brought inside the cabin. The in-cabin display apparatus transfers a received input signal to the mobile information terminal, and the mobile information terminal generates a first display signal to be displayed by the in-cabin display apparatus, and a second display signal to be displayed by the display unit of the mobile information terminal. A first display object based on the first display signal and a second display object based on the second display signal may be the same, or they may differ in at least one of size, shape, color, brightness, and change over time. For example, it is possible to cause the display unit of the in-cabin display apparatus and the display unit of the mobile information terminal to display the same map information and the like, and to cause them to display mutually different information.

That is to say that in this in-vehicle communication system, based on the input signal sent from the in-cabin display apparatus, the mobile information terminal generates the first display object to be displayed on the in-cabin display apparatus and a second display object to be displayed on the mobile information terminal from information included in the mobile information terminal. However, no configuration is disclosed in which a vehicle-side processing apparatus generates a display object to be displayed on the in-cabin display apparatus or on the mobile information terminal based on information included on the vehicle side.

From Patent Document 5, there is known to be a vehicle apparatus including a vehicle touch panel, in which a screen of a touch-panel mobile phone is displayed on the vehicle touch panel due to the vehicle apparatus and the touch-panel mobile phone being connected. With this vehicle apparatus, if a standby screen is displayed on the touch panel unit of the mobile phone, the image data of the standby screen is transmitted from the mobile phone to the vehicle apparatus, and a similar standby screen is displayed on the vehicle touch panel. Furthermore, if a call is received on the mobile phone, an incoming call screen displayed on a touch panel unit 16 of a mobile phone 1 is also transmitted from the mobile phone to the vehicle apparatus, and a similar incoming call screen is displayed on the vehicle touch panel. In other words, a display image that is equivalent to the display image of the mobile phone is displayed on the vehicle touch panel. However, no configuration is disclosed in which the display image of the vehicle touch panel or an image relating thereto is displayed on the mobile phone.

Also, Patent Document 6 discloses a mobile terminal capable of communicating with an automobile information device that manages vehicle information, and with an external content-providing server. When a user holding the mobile terminal gets into the automobile, the mobile terminal searches for a nearby automobile information device, and after an automobile information device is found, communication is performed between the mobile terminal and the automobile information device that was found. Furthermore, communication is performed also between the mobile terminal and a content-providing server using a mobile communication unit, and acquired content is displayed on the display of the mobile terminal. Also, it is disclosed that instead of the content being displayed on a display, the content data are transmitted to the automobile information device so that the content is displayed on the display of a navigation apparatus. However, there is no disclosure regarding a technique for performing display such that the information obtained from the automobile information device is sorted between the display of the mobile terminal and the display of the navigation apparatus.

PRIOR ART DOCUMENTS

Patent Documents

Patent Document 1: JP 2004-139469 A
Patent Document 2: JP 2004-213239 A
Patent Document 3: JP H11-032550 A
Patent Document 4: JP 2011-166290 A (FIG. 1)
Patent Document 5: JP 2012-213141 A (FIGS. 1, 6)
Patent Document 6: JP 2010-217944 A (FIG. 1)

SUMMARY OF THE INVENTION

Problem(s) to be Solved by the Invention

In view of the foregoing circumstances, a technique of acquiring information by which it is possible to objectively evaluate whether or not a ground work vehicle is efficiently performing work travel while traveling and performing work using a work apparatus is desired.

Furthermore, with the above-described conventional techniques, a driver having a mobile communication terminal gets into a common vehicle such as a passenger car. However, in the case of using a ground work vehicle such as an agricultural machine or a construction machine, information relating to ground work is used as display information that is to be provided to the driver. There are many different types of information relating to ground work, and it is not sufficient to merely display it on the vehicle-mounted display or the display of the mobile communication terminal. For this reason, a technique is desired according to which display information including information relating to ground work is effectively displayed to the driver.

Solution(s) to the Problem(s)

A ground work vehicle according to the present invention, which is configured to perform work using a work apparatus while traveling, includes: a travel information generation unit configured to, over time, generate travel information indicating a travel state; a work information generation unit configured to, over time, generate work information indicating a work state of the work apparatus; a travel evaluation unit configured to, based on the travel information and the work information, divide the traveling of the ground work vehicle into non-work traveling and actual work traveling; and a data visualization unit configured to generate visual data, according to which the result of the division performed by the travel evaluation unit is made visible.

According to this configuration, rather than simply acquiring the state of the work apparatus during work traveling, travel information indicating the travel state of the ground work vehicle and work information indicating the work state of the work apparatus are generated over time, and by furthermore evaluating these pieces of time-based information, the traveling of the ground work vehicle is divided into non-work traveling and actual work traveling. This makes it possible to compare non-work traveling, which is ineffective work traveling, with actual work traveling, which is effective work traveling, from the start of work to the end of work, and to determine whether or not the work traveling was efficient. Moreover, since the result of dividing the non-work traveling and the actual work traveling is made visible, a person can effectively use the visual data when this determination is performed.

In one preferred embodiment of the present invention, if a configuration is used in which the travel information includes travel distance data and the work information includes driving state data indicating driving time and non-driving time of the work apparatus, the travel evaluation unit can easily distinguish between the non-work traveling and the actual work traveling based on the driving state data, and can moreover calculate a non-work traveling distance and an actual work traveling distance. Furthermore, upon obtaining the traveling distance, it is possible to calculate non-work travel time and actual work travel time based on the travel speed of the ground work vehicle. If the display data for the display panel of the ground work vehicle is used as the visual data for the divided travel distance and travel speed, a worker can know the work efficiency by looking at the display panel as well. This will provide motivation to improve the work efficiency.

In a further preferred embodiment, a fuel consumption information generation unit is included, which is configured to, over time, generate fuel consumption information indicating a fuel consumption amount, and a fuel consumption evaluation unit is furthermore included, which is configured to calculate a fuel consumption amount for when performing work traveling and a fuel consumption amount for when performing non-work traveling by associating the fuel consumption information with the travel information and the work information. This configuration can be utilized in the selection of an optimal work travel route for subsequent work by comparing the fuel consumption amount for when performing work traveling and the fuel consumption amount for when performing non-work traveling.

Note that by taking into consideration the fuel consumption per unit work, more precise evaluation relating to fuel consumption can be performed. Accordingly, an embodiment is also preferable in which the work information includes a work amount and a fuel consumption evaluation unit configured to calculate the fuel consumption per unit work amount is included.

With an agricultural work vehicle or a construction work vehicle, a lot of work is performed while traveling and temporarily stopping work repeatedly. Accordingly, in order to determine whether or not this kind of work vehicle is being used efficiently, it is necessary to clarify the operating behavior of the devices relating to traveling and work. For this reason, in one preferred embodiment of the present invention, the travel information includes one or both of an operation time and the number of instances of operating a travel operation device, the work information includes one or both of an operation time and the number of instances of operating a work operation device, and a device operation evaluation unit is included which is configured to integrate one or both of the operation times and the numbers of instances of operation. For example, if a travel operation device is a travel clutch, by comparing the ON time and OFF time of the travel clutch, preferably over time, information that is useful for determining the travel efficiency can be obtained. Similarly, if a work operation device is a work clutch, by comparing the ON time and OFF time of the work clutch, preferably over time, information that is useful for determining the work efficiency can be obtained. When this kind of information in particular is displayed on an operation panel or the like, it motivates the driver to work more efficiently.

If the ground work vehicle is a harvester for rice, wheat, corn or the like, the work apparatus is realized as a grain stalk processing apparatus, and in this kind of embodiment, it is proposed that the work information includes a grain harvest amount. By associating the travel information and the grain harvest amount, it is possible to obtain an index that is important for determining the work efficiency, such as the grain harvest amount per unit travel distance. Furthermore, by using this index to create visual data, it is possible to perform display thereof on an operation panel or the like in a display mode that is easy to understand. At this time, if grain quality data are also included in the work information, not only the grain harvest amount per unit travel distance, but also the quality thereof can be included, and it is therefore possible to obtain an even more effective index.

In one preferred embodiment of the present invention, a data link unit is included which is configured to associate positioning data indicating a machine position outputted from a GPS module with the travel information and the work information. According to this configuration, by associating evaluation information derived from the travel information and the work information with GPS positioning data, which is absolute position information, it is possible to, for example, obtain an evaluation for each plot of a work site composed of multiple plots. Furthermore, by performing visualization such that the evaluation of each plot is expanded on the map, visual information relating to efficient use of the ground work vehicle can be obtained which is easy to understand.

Thus, more preferable travel evaluation of the work vehicle is obtained due to being associated with the GPS positioning data, which is absolute position information. Accordingly, another ground work vehicle according to the present invention that is configured to perform work using a work apparatus while traveling includes: a GPS module configured to output positioning data indicating a machine position; a work information generation unit configured to, over time, generate work information indicating a work state of the work apparatus; a travel evaluation unit configured to, based on the positioning data and the work information, divide the travel route of the ground work vehicle into a non-work travel route and an actual work travel route; and a data visualization unit configured to generate visual data according to which the result of the division performed by the travel evaluation unit is made visible.

With the provision of a GPS module, the vehicle position over time, or in other words, the travel route, can be obtained based on the GPS positioning data. Accordingly, with one preferred embodiment of the ground work vehicle in which a GPS module is mounted, the travel evaluation unit calculates a non-work travel distance based on the non-work travel route and calculates an actual work travel distance based on the actual work travel route, and the data visualization unit generates a diagram according to which a ratio between the non-work travel distance and the actual work travel distance is made visible. This type of diagram is superior information according to which it is possible to objectively evaluate whether or not the ground work vehicle is working and traveling efficiently.

Functional units of the evaluation system in particular in the above-described ground work vehicle, such as the travel evaluation unit, the data visualization unit and the like do not need to be provided in the ground work vehicle. The above-described effects of the present invention can be obtained also in the case of constructing a network computer system in which a computer terminal equipped in the ground work vehicle is used as a client and the computer of the management center is used as a management server. Note that a computer system in this context is not limited to a system in the narrow sense, such as a server-client system, and means a system in a broad sense, such as a cloud system. By employing this kind of network computer system, the present invention can be applied as-is to a management system composed of a ground work vehicle that performs work using a work apparatus while traveling, and a management server that manages the ground work vehicle. In this ground work vehicle management system, the ground work vehicle includes a travel information generation unit configured to, over time, generate travel information indicating a travel state, and a work information generation unit configured to, over time, generate work information indicating a work state for the work apparatus, and the management server includes a data input unit configured to, via a communication line, receive ground work vehicle information in which the travel information and the work information are included, a travel evaluation unit configured to divide traveling of the ground work vehicle into non-work traveling and actual work traveling based on the travel information and the work information, a data visualization unit configured to generate visual data according to which the result of the division performed by the travel evaluation unit is made visible, and a data output unit configured to transmit the visual data to a requestor. With this kind of management system, it is possible not only to obtain the above-described effects with regard to the ground work vehicle of the present invention, but by using many ground work vehicles as clients, it is possible to perform evaluation regarding efficient usage for many ground work vehicles in a specific region or many ground work vehicles of a specific manufacturer.

A ground work vehicle according to the present invention, which has a vehicle-mounted display configured to display information, includes: a work information generation unit configured to generate internally-generated work information, which is information relating to ground work; a data input unit configured to be able to exchange data with a mobile communication terminal carried by a driver; a first display data generation unit configured to, based on the internally-generated work information, generate first display data to be displayed on the vehicle-mounted display; a second display data generation unit configured to, based on the internally-generated work information, generate second display data to be displayed on a display of the mobile communication terminal; and a third display data generation unit configured to generate third display data to be displayed on the vehicle-mounted display, based on externally-generated work information relating to ground work, which is generated by a remotely-located management center and is acquired by the data input/output unit using the mobile communication terminal as a relay.

According to this configuration, the internally-generated work information, which is information relating to ground work, is divided into first display data to be displayed on the vehicle-mounted display and second display data to be displayed on the display of the mobile communication terminal, and the data are displayed on the respective displays. According to this, it is possible to use a configuration in which information that is normally needed for driving is displayed on a vehicle-mounted display with superior visibility for the driver who normally drives the ground work vehicle, and information to be focused on at a short distance is displayed on the display of the mobile communication terminal, which the driver can hold in his or her hand and focus on as needed. In other words, it is possible to achieve information display sorting in which differences in the display properties of the vehicle-mounted display and the display of the mobile communication terminal with respect to the driver are utilized. Also, externally-generated information, such as content of a ground work request, which is sent from a remotely-located management center using a communication function of a mobile communication terminal, can be displayed on the vehicle-mounted display as well, and display information including information relating to the ground work can be displayed effectively to the driver.

There are cases where the externally-generated information sent from the management center includes display content preferably displayed on the display of the mobile communication terminal, which the driver can view at a close range. Accordingly, it is preferable that a fourth display data generation unit is included, which is configured to, based on the externally-generated work information, generate fourth display data to be displayed on the display of the mobile communication terminal.

Some drivers of the ground work vehicle are experienced and others are inexperienced, and there are differences in visual acuity among drivers as well, with some being near-sighted and others being far-sighted and the like. For this reason, it is convenient to change the content displayed on the vehicle-mounted display and the content to be displayed on the display of the mobile communication terminal depending on the driver. In one preferred embodiment of the present invention, a driver recognition unit is included, which is configured to recognize the driver based on ID information of a mobile communication terminal connected via the data input/output unit so as to be able to transfer data, and display content on one or both of the vehicle-mounted display or the display of the mobile communication terminal is changed based on registration information of the recognized driver.

The specific content of the internally-generated work information, which is information relating to the ground work, is operation state data of the equipped ground work apparatus or vehicle travel state data, but depending on the type of the ground work apparatus, there are cases where the data indicating the travel state of the vehicle is more important, and there are cases where the data indicating the operation state of the ground work apparatus is more important. For this reason, it is preferable that the internally-generated work information includes one or both of the operation state data of the equipped ground work apparatus and the vehicle travel state data. Also, there are many cases where ground work is repeated in different times on the same ground work site for agricultural work and the like in particular. Accordingly, past ground work result data and ground work target data that is corroborated by such past ground work result data are important for the driving of the ground work vehicle. For this reason, it is preferable that the externally-generated work information includes one or both of the past ground work result data for the target ground work site and ground work target data determined by an external apparatus.

The equipped ground work apparatus and the driving method therefor change depending on the type of the ground work, the properties of the ground work site, the environment of the ground work site and the like. Accordingly, it is advantageous to extract content to be included in the first display data and content to be included in the second display data from the internally-generated work information based on the ground work attribute information in which such information is included.

Since the mobile communication terminal has a communication function, when used, it is possible to sense at least the approximate position at which the terminal is located. In particular, if it is sensed that the position of the terminal is away from the work site at a work time, it is conceivable that some special situation has arisen. Upon considering such a case, it is preferable that the content of the display data to be sent to the mobile communication terminal is changed based on the location of the mobile communication terminal. In particular, in cases where the location of the mobile communication terminal can be accurately determined, such as a case in which the driver has gotten out of the ground work vehicle holding the mobile communication terminal, or a case in which it is sensed that the driver is at a position from which the vehicle-mounted display cannot be seen, it is convenient to cause all of the information to be displayed on the display of the mobile communication terminal.

Due to the fact that linking of the display of the mobile communication terminal brought inside of the ground work vehicle and the vehicle-mounted display, as described above, can be realized by using a ground work information display program installed in the mobile communication terminal, a storage medium storing such a program, and by using a method of carrying out such linking, the rights of this invention are directed to a program, a recording medium, and a method. For example, regarding the ground work information display program, a ground work information display program is proposed, which is configured to cause a computer to realize: an internal display data generation function according to which internal display data to be displayed on a built-in display is generated based on externally-generated work information relating to ground work, which is generated by a remotely-located management center and is received via a data communication line; an external display data generation function according to which external display data to be displayed on the vehicle-mounted display is generated based on the externally-generated work information; and a function according to which the external display data are transmitted to the data input/output unit.

Also, the ground work information display program can be configured such that the above-described effects obtained in the various preferred embodiments are obtained. For example, the ground work information display program can be furthermore configured to cause a computer to execute a function according to which display data to be displayed on the display of the computer is generated based on internally-generated work information relating to ground work, which is generated by the ground work vehicle and is sent from the ground work vehicle. The ground work information display program can be configured such that display content of one or both of the vehicle-mounted display and the display of the mobile communication terminal is changed based on registered information on an owner, which is obtained by inquiry of the ground work vehicle or the management center using internally-stored ID information of the owner. Similarly, it is possible to obtain a similar effect with the above-described storage medium storing an agricultural work management program of the present invention and ground work information display method of the present invention. Note that the storage medium in this context is a non-transitory concrete medium such as a USB memory or SD card (registered trademark).

BRIEF DESCRIPTION OF THE DRAWINGS

FIG. 7 is a diagram of a screen displayed on a display, in which work evaluation data of the combine has been made into a table.

FIG. 8 is a diagram of a screen displayed on a display, in which agricultural work evaluation data has been made into a table in a large region about the size of a town or village.

FIG. 15 is a flowchart showing a flow of data between a combine and a smartphone.

EMBODIMENTS OF THE INVENTION

Figure 1:
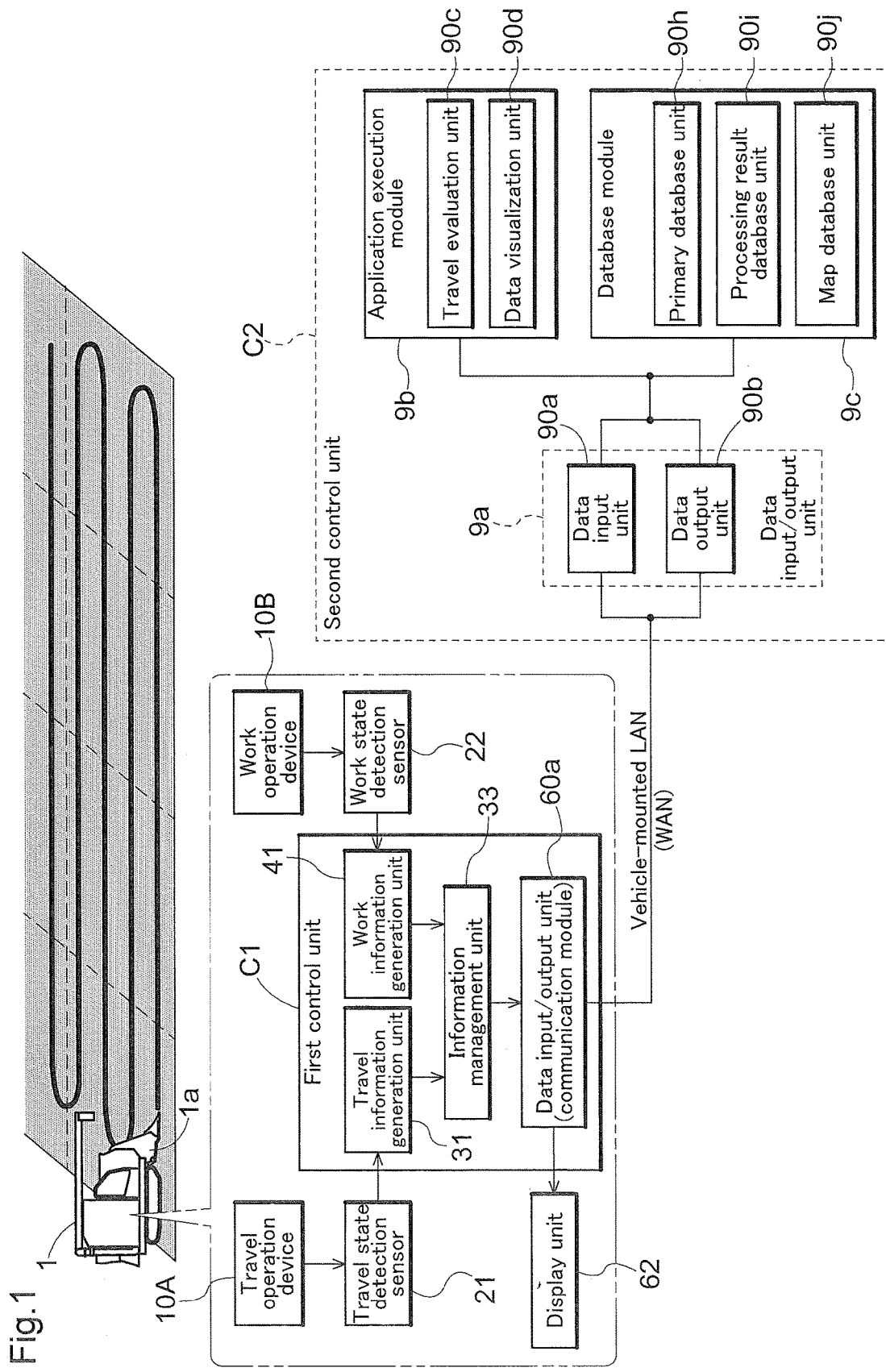
FIG. 1 is a basic configuration diagram schematically showing a basic configuration of a ground work vehicle and a ground work vehicle management system according to the present invention.
Figure 2:
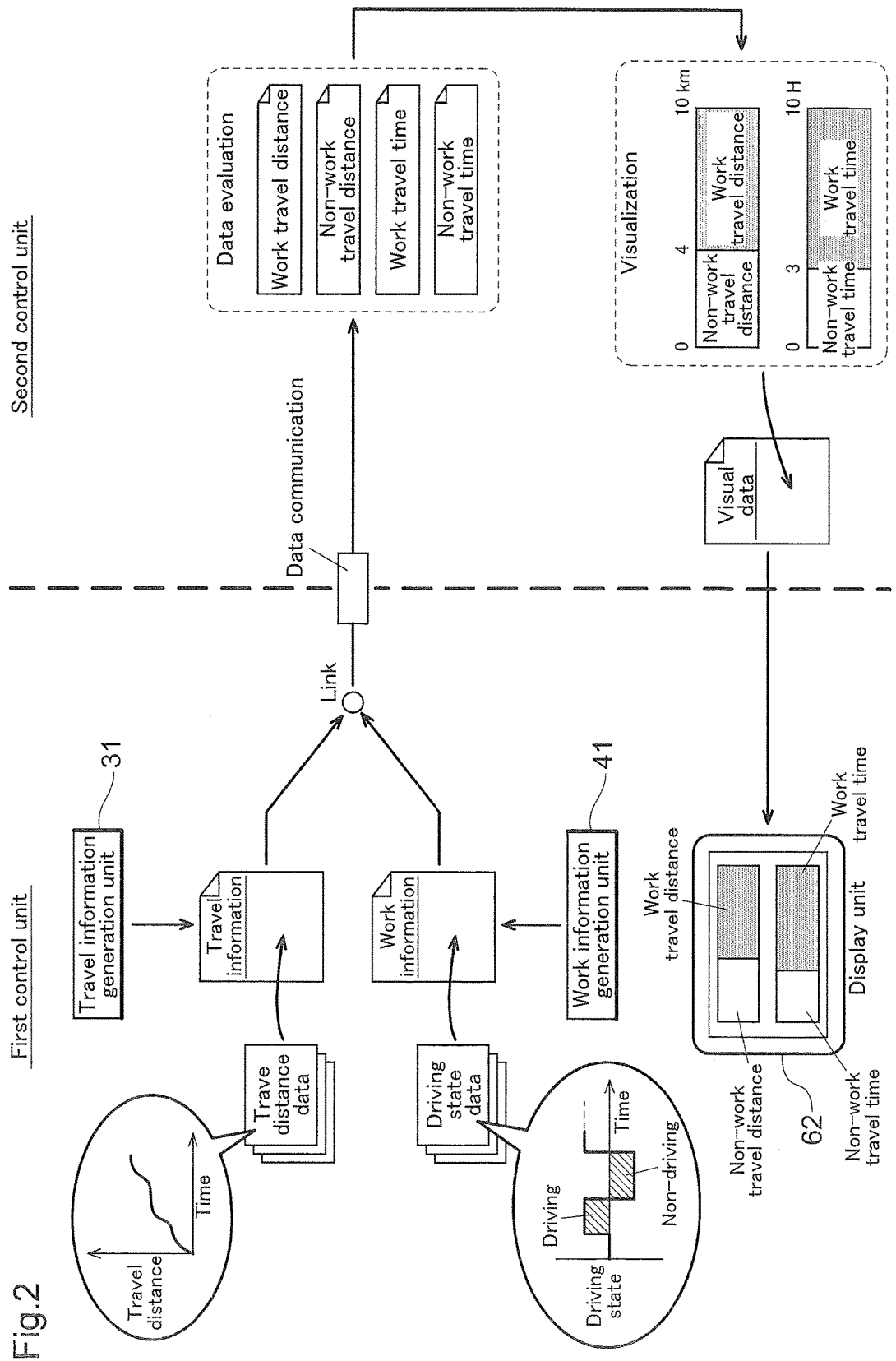
FIG. 2 is a schematic view illustrating a flow of data communication according to the basic configuration as shown in FIG. 1.

Basic mechanisms of a ground work vehicle and a ground work vehicle management system according to a first embodiment of the present invention will be described hereinafter. FIG. 1 schematically shows a basic configuration of a ground work vehicle and a ground work vehicle management system. FIG. 2 schematically shows a flow of data (information) communication in the basic configuration as shown in FIG. 1.

Herein, a ground work vehicle 1 travels over the entirety of an agricultural land by combining linear travel and pivoting travel, and performs work by causing a work apparatus 1a to operate. FIG. 1 shows that a first control unit C1 and a second control unit C2, mutually connected by a vehicle-mounted LAN (Local Area Network), are mounted on the ground work vehicle 1 to act as an information processing system. However, assuming that the vehicle-mounted LAN is replaced with a WAN (Wide Area Network) such as the Internet, this system can be regarded as acting as a ground work vehicle management system instead, including a ground work vehicle in which the first control unit C1 is mounted and a management computer that realizes the second control unit C2, which is connected by the WAN to the first control unit C1 via a wireless line.

The ground work vehicle 1 includes a travel operation device 10A such as a travel clutch, a work operation device 10B such as a work clutch, a travel state detection sensor 21 that detects a travel state, and a work state detection sensor 22 that detects a work state. The driving cabin of the ground work vehicle 1 is provided with a display unit 62 that visually informs the driver of various types of information.

A travel information generation unit 31, a work information generation unit 41, an information management unit 33 and a data input/output unit 60a are implemented in the first control unit C1. The travel information generation unit 31 generates travel information based on detection data relating to travel that is sent from the travel state detection sensor 21. For example, the travel information can include time-based operation data, such as time for each operation state and the number of instances of operating the travel clutch, and/or travel distance data that can be calculated based on the wheel rotation speed and the like. The work information generation unit 41 generates work information based on the detection data relating to work that is sent from the work state detection sensor 22. For example, the work information can include time-based operation data indicating time for each operation state of the work clutch, the number of instances of operating the work clutch and the like. The information management unit 33 associates the travel information and work information generated over time and, as needed, performs conversion of the data so that it is suitable for processing in the process of subsequent processing. The data input/output unit 60a is a data input/output unit on the first control unit C1 side for performing data conversion between the first control unit C1 and the second control unit C2. If the first control unit C1 and the second control unit C2 are connected by a WAN such as the Internet, the data input/output unit 60a functions also as a data conversion unit that converts the data adapted to an IP (Internet Protocol). In this kind of mode, for example, the data input/output unit 60a is considered as acting as a communication module in which a communication device, which is a hardware device, is integrated with a Web browser, which is a software device.

A data input/output unit 9a, an application execution module 9b, and a database module 9c are implemented in the second control unit C2. The data input/output unit 9a includes a data input unit 90a that receives information from the first control unit C1, and a data output unit 90b that sends information to the first control unit C1. The application execution module 9b has a function of processing information from the first control unit C1 and is normally configured based on a program and a program execution environment. The travel evaluation unit 90c and a data visualization unit 90d are realized in the application execution module 9b by execution of a program. The travel evaluation unit 90c has a function of dividing the traveling of the ground work vehicle into non-work traveling and actual work traveling, based on travel information and work information that are, or can be, associated with each other. The data visualization unit 90d has a function of generating visual data according to which the result of the division performed by the travel evaluation unit 90c is made visible. The data are made visible by creating a graph or an illustration based on the data. For example, if the result of the division is the work travel distance and the non-work travel distance, a circle graph or a bar graph indicating the ratio between the work travel distance and the non-work travel distance is generated as the visual data. The database module 9c is a data recording unit constituted by a memory. The database module 9c includes a primary database unit 90h that records information sent from the first control unit C1 substantially as it is, a processing result database unit 90i that records the evaluation data and the visual data outputted respectively from the travel evaluation unit 90c and the data visualization unit 90d, and a map database unit 90j that stores map data for the work site and the like.

FIG. 2 shows an example of a flow of data communication between the first control unit C1 and the second control unit C2 having the above-described configuration. In FIG. 2, in the first control unit C1, the travel information that includes travel distance data indicating elapsed time and travel distance, and the work information that includes driving state data including a time chart of the driving times and non-driving times of the work apparatus are linked in real time or converted into a linkable format, and then sent to the second control unit C2. The second control unit C2 evaluates the travel information and work information that were sent, and calculates, as the evaluation data, the work travel distance and non-work travel distance, and/or the work travel time and non-work travel time. The pieces of evaluation data are made into a bar graph by the data visualization unit 90d, and sent to the first control unit C1 to act as visual data to be displayed on the display unit 62 along with other driving information.

Figure 3:
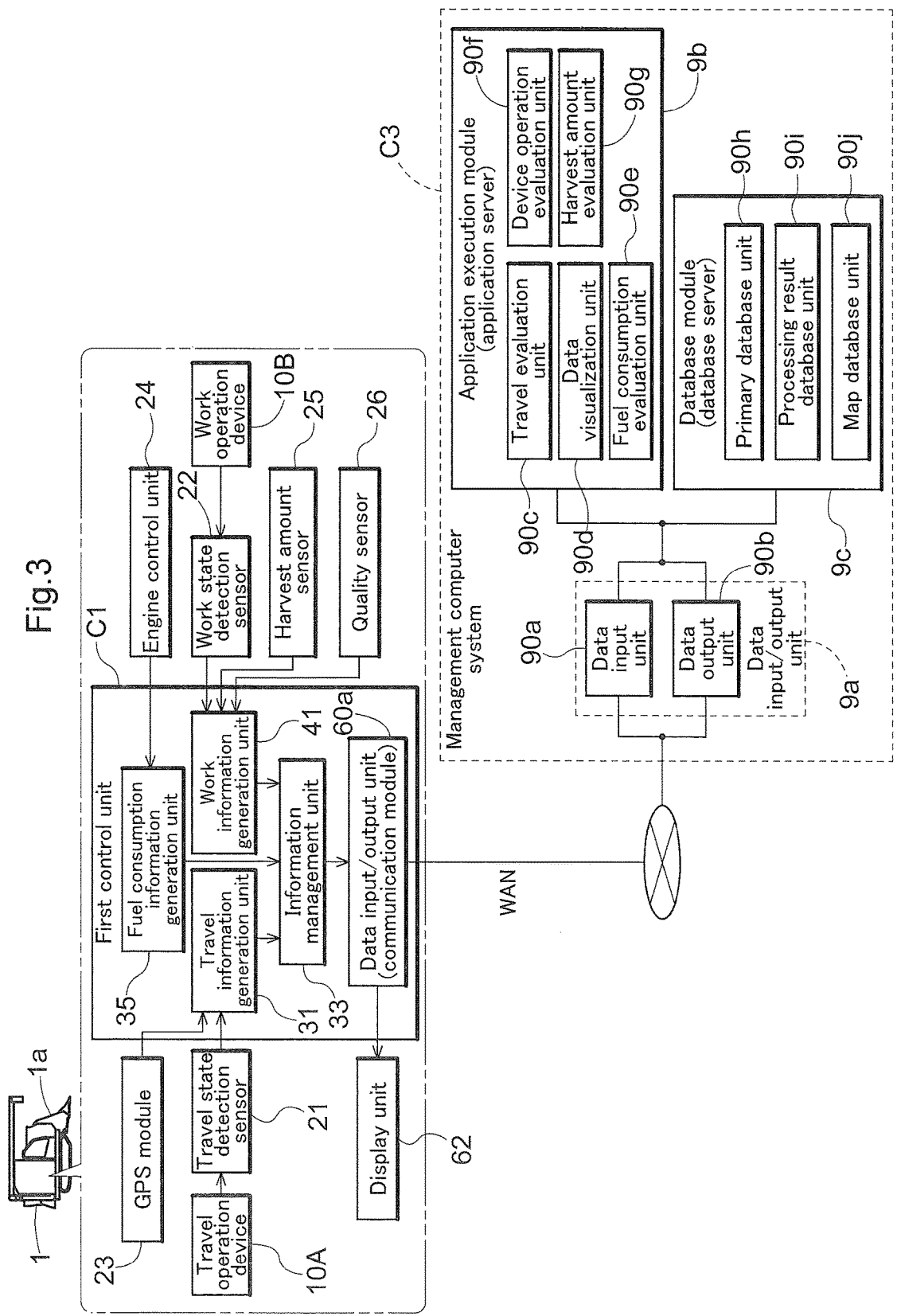
FIG. 3 is a diagram of a basic configuration obtained by adding several optional functions to the basic configuration as shown in FIG. 1.
Figure 4:
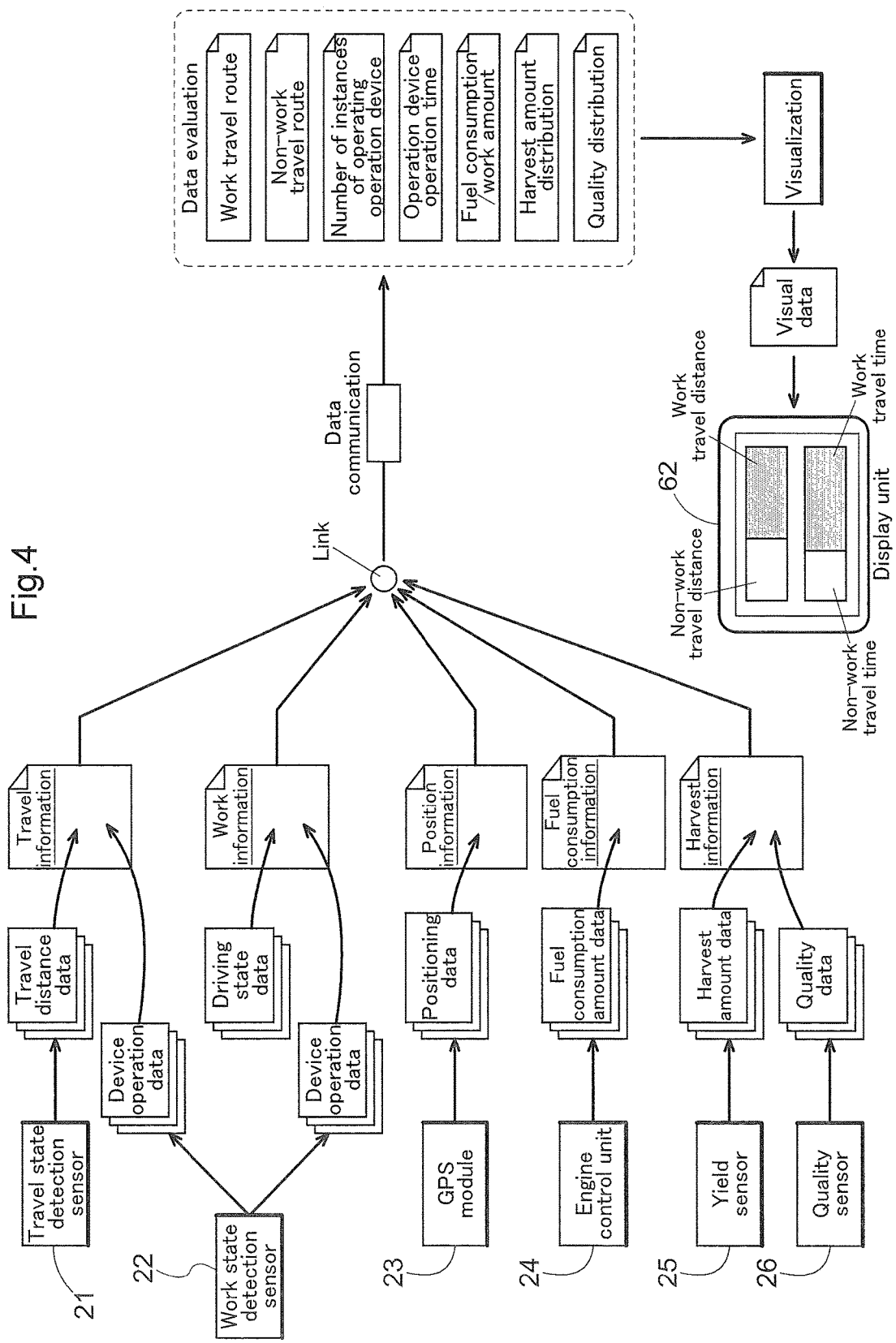
FIG. 4 is a diagram for schematically illustrating a flow of data communication according to the basic configuration as shown in FIG. 3.

FIG. 3 shows a diagram of a basic configuration obtained by adding several optional functions to the basic configuration as shown in FIG. 1 in order to display even more information that is effective for increasing the work efficiency on the display unit 62. Unlike FIG. 1, this basic configurational diagram shows that the first control unit C1 and the management computer system (server system) C3, which functions as the second control unit in the FIG. 1 configuration, are mutually connected by a WAN such as the Internet via a wireless line. In other words, a server-client system is configured in which the first control unit C1 functions as a client and the management computer system C3 functions as a server. Of course, if a configuration is used in which the first control unit C1 and the management computer system C3 are connected by the vehicle-mounted LAN as shown in FIG. 1, this system can be considered as acting as a closed computer system within the ground work vehicle 1 including the first control unit C1 and the second control unit C2. FIG. 4 shows a flow of data communication in the basic configuration as shown in FIG. 3.

A GPS module 23 that outputs positioning data indicating a longitudinal value, a latitudinal value and an elevation value has been added to the ground work vehicle 1. The positioning data are sent to the travel information generation unit 31 and in some cases to the work information generation unit 41, to act as position data indicating the real-time travel position or work position. Herein, the ground work vehicle 1 is configured to act as an agricultural work vehicle that performs harvesting of an agricultural product; and a yield sensor 25 that measures the harvest amount of the harvested crop and a quality sensor 26 that measures the quality of the harvested crop are additionally equipped in the ground work vehicle 1 or the work apparatus 1a. Data measured by the yield sensor 25 and the quality sensor 26 are sent, over time, to the work information generation unit 41, wherein harvested crop information is generated and incorporated into the work information.

The first control unit C1 additionally includes a fuel consumption information generation unit 35 that receives engine control data relating to fuel consumption from the engine control unit 24 and generates fuel consumption information based on the engine control data. If the engine mounted on the ground work vehicle 1 is a common rail engine, a fuel injection amount and the number of injections are sent from the engine control unit 24, and therefore those values can be used to calculate the fuel consumption amount.

Herein as well, the information management unit 33 generates information for transmission by associating the travel information, work information, fuel consumption information and the like with one another; and transmits (uploads) the resultant information to the management computer system C3 via the data input/output unit 60a. In the management computer system C3, the data input/output unit 9a is included to act as an input/output server, the application execution module 9b is included to act as an application server including multiple application programs, and the database module 9c is included to act as a database server. If the input/output server 9A is a Web server, the data input/output unit 60a of the first control unit C1 functions as a Web browser.

In addition to the travel evaluation unit 90c and the data visualization unit 90d, a fuel consumption evaluation unit 90e, a device operation evaluation unit 90f, and a harvested crop evaluation unit 90g have been added to the application server (application execution module) 9b. The fuel consumption evaluation unit 90e evaluates the relationship between work traveling and fuel consumption based on the fuel consumption information, work information and travel information. As the relationship between work traveling and fuel consumption, for example, the fuel consumption evaluation unit 90e uses the actual work travel time or actual work travel distance and the non-work travel time or non-work travel distance that are derived by the travel evaluation unit 90c, and the fuel consumption amount, to derive fuel consumption evaluation data relating to fuel consumption during actual work and fuel consumption during non-work. Another preferred fuel consumption evaluation data would be the fuel consumption per work amount. The fuel consumption evaluation data are changed to visual data, and displayed on the display unit 62 through the data input/output unit (Web browser) 34. Furthermore, if the travel route of the harvester 1 evaluated by the travel evaluation unit 90c is divided into an actual work travel route and a non-work travel route, it is possible to create an index for efficient work travel by comparing the fuel consumption with the actual work travel route and the non-work travel route and by evaluating the resultant comparison. The distinction between work and non-work is determined by detecting engagement/disengagement of a cutting clutch or the like, for example.

The device operation evaluation unit 90f statistically evaluates the number of instances of operation and the operation time of the travel operation device 10A and the work operation device 10B based on the travel information and the work information. The evaluation result is an index, according to which it is determined whether or not the travel and work is efficient. Furthermore, such operation device maintenance data are derived from the number of instances of operation and the operation time being integrated in addition to past data in the database server 6. Operation device maintenance data are recorded for each ground work vehicle 1 and is used for a maintenance service provided by a maintenance company.

The harvested crop evaluation unit 90g generates harvested evaluation data by retrieving harvested crop information, indicating the harvest amount and quality of the harvested crop, from work information sent from the ground work vehicle 1, and by statistically evaluating the harvest amount and quality. For example, by associating the harvest evaluation data with the travel route of the ground work vehicle 1 calculated by the travel evaluation unit 90c, it is possible to generate harvest amount distribution data and quality distribution data for the agricultural land as well.

Figure 5:
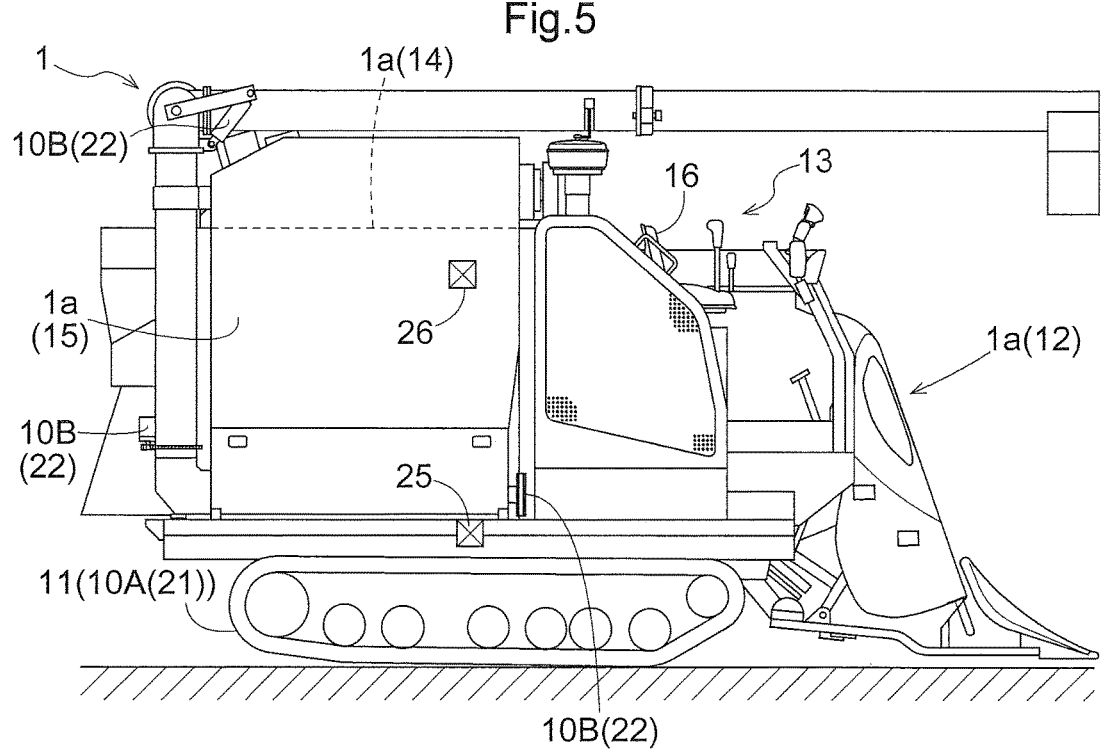
FIG. 5 is a lateral side view of a combine serving as an example of a ground work vehicle.

Next, a specific embodiment of the ground work vehicle 1 according to the present invention will be described with reference to the drawings. This embodiment is based on the basic configuration of the ground work vehicle management system described with reference to FIGS. 3 and 4. A harvester serving as a ground work vehicle is a crawler-type culm-head charging type combine 1. FIG. 5 is a lateral side view of a combine 1, in which a crawler travel apparatus 11 that is driven so as to rotate by an engine is included, and a driving cabin 13 is formed in the central portion. As the work apparatus 1a, a cutting unit 12 is equipped on the front portion of the device body, and a threshing apparatus 14 and a grain tank 15 are equipped on the rear portion of the device body. A yield sensor 25 that detects the discharge amount of grain at a discharge opening of a conveying conveyor that conveys grain from the threshing apparatus 14 to the grain tank 15, and a taste analyzer 26, which is an example of a quality sensor 26, are equipped, although the yield sensor 25 and the quality sensor (taste analyzer 26) are merely shown schematically. Measurement data for the moisture value and protein value of the grains is outputted from the taste analyzer 26 as the quality data. The travel state detection sensor 21, which detects the operation state of the travel operation device 10A such as a travel clutch or a speed change clutch, and the work state detection sensor 22, which detects the operation state of the work operation device 10B such as a cutting clutch, a threshing clutch, a grain discharge clutch, various hydraulic cylinders, or an unloader pivot motor, are also included as in case with a conventional combine.

Figure 6:
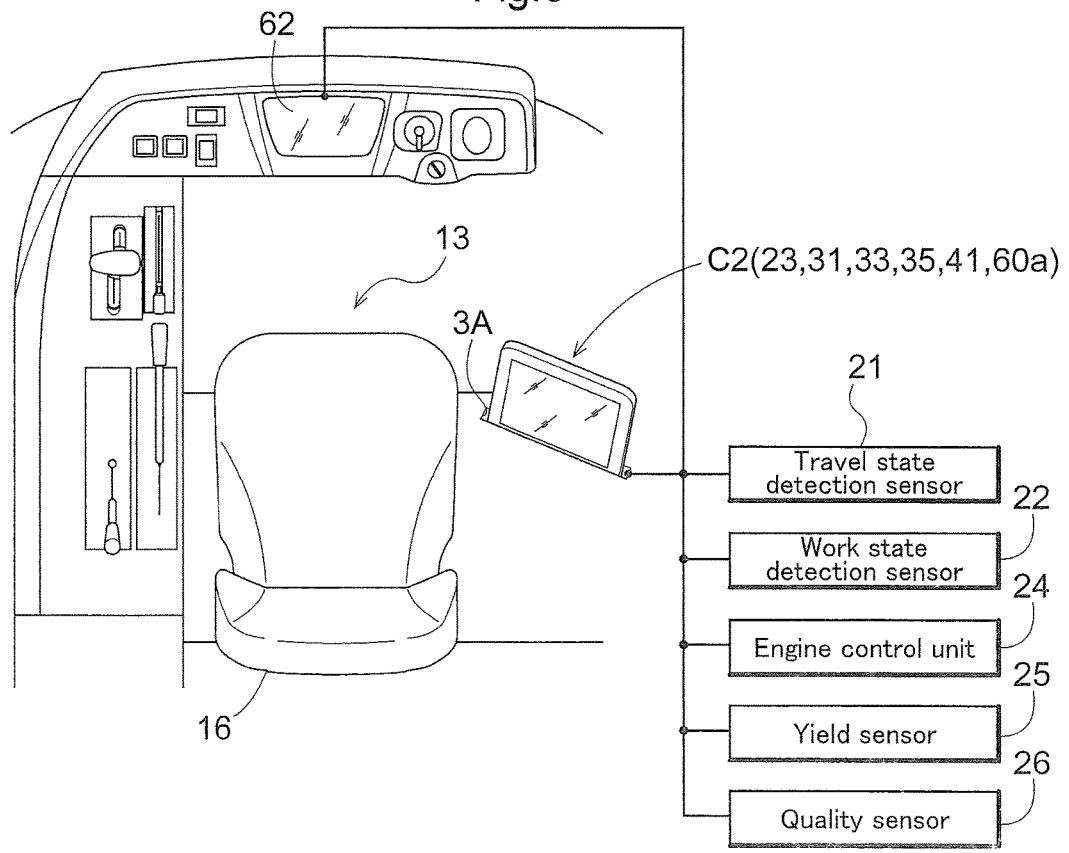
FIG. 6 is a schematic diagram schematically showing an internal space of a driving cabin of a combine.

FIG. 6 is a schematic diagram schematically showing the internal space of the driving cabin 13. A driver's seat 16, various maneuvering levers, operation switches, a meter display panel 62 that is an example of a display unit and the like are arranged in the driving cabin 13. In this embodiment, the first control unit C1 is constituted by various ECUs and various sensors of the combine 1, and a portable tablet-type computer or smartphone capable of exchanging data with the ECUs and sensors via the vehicle-mounted LAN. The tablet-type computer or smartphone is used while mounted on a mounting portion 3A that is provided near the driver's seat 16. The mounting portion 3A functions as a power-supplying connection portion and a data exchange connection portion for the tablet-type computer or the smartphone. Note that since the tablet-type computer or the smartphone has a relatively large touch panel display, it can be used as the meter display panel 62 or a sub-monitor for the meter display panel 62.

In this embodiment, a data input/output unit 60a that can be connected to the Internet via the GPS module 23 or the mobile phone line is incorporated in the tablet-type computer or the smartphone included in the first control unit C1. Also, applications functioning as the travel information generation unit 31, the work information generation unit 41, the information management unit 33 and the fuel consumption information generation unit 35 are installed in the tablet-type computer or the smartphone. Accordingly, harvest amount data from the yield sensor 25, moisture value data and protein value data from the taste analyzer 26, engine control data from the engine control unit 24, and detection data from the travel state detection sensor 21 and work state detection sensor 22 are sent via the connection portion 3A to the tablet-type computer or the smartphone.

Upon being introduced into a predetermined agricultural land that is to be subjected to harvesting work, the combine 1 repeatedly performs cutting processing and threshing processing while traveling over the agricultural land. At this time, position information including positioning data (latitude, longitude, elevation) that indicates the current position of the combine 1 is generated by the GPS module 23 for the first control unit C1, and the positioning-measurement information composed of the actual time and the positioning data is sent over time to the first control unit C1. At the same time, the harvest amount data, quality data (moisture value and protein value of grains), engine control data and various types of measurement data are also sent over time to the first control unit C1.

With the travel information generation unit 31 in the first control unit C1, the received positioning data are converted into position data indicating the harvesting travel position or harvesting work position to be incorporated in the travel information. At this time, the positioning data composed of the longitude and latitude are converted into a coordinate system with a predetermined position set in the agricultural land acting as the origin, and it is thereby possible to convert the harvesting position data into position data composed of an X-coordinate value and a Y-coordinate value. The travel information generation unit 31 combines the travel distance data, the device operation data of the travel state detection sensor 21 and the like with the position data so as to generate the travel information. The work information generation device 41 combines, with the position data, driving state information indicating the driving state of the work apparatus 1a, device operation data of the work state detection sensor 22, and furthermore the harvest amount data, quality data and the like so as to generate the work information. The fuel consumption information generation unit 35 combines the fuel consumption data, which was calculated based on the engine control data, with the position data so as to generate the fuel consumption information. Note that the travel information, work information and fuel consumption information are described separately for the sake of making the description easier to understand, but of course, in actuality, all of these pieces of information may be integrated together as one-piece terminal information. The information management unit 33 effects association and/or integration of these pieces of information including the positioning data, as well as subsequent disintegration thereof. That is to say, the information management unit 33 functions also as a data link unit that associates the positioning data with the travel information, work information and the like. At this time, in order to allocate the various pieces of data included in the travel information, work information and fuel consumption information to a specific area of the agricultural land, correction(s) is/are made to a time difference between the measurement time of the harvesting work position and the quality measurement time of the grain harvested at that position, for example, with taking into consideration of the time for the cutting processing and the threshing processing. Instead of above, the travel information, work information, and fuel consumption information may be associated with one another in the management computer system C3 serving as a server.

In FIG. 3, the second control unit C2 is constituted by a management computer system that is a server for the first control unit C1, and therefore travel information, work information, and fuel consumption information sent from a terminal via the WAN (or a wide area communication line) are stored in the primary database unit 90h of the database server 9c functioning as the database module as shown in FIG. 1, and data serving as the result of the processing performed by the applications in the application server 9b functioning as the application execution module as shown in FIG. 1 is stored in the processing result database unit 90i. Accordingly, in response to a request from a user, visual data obtained by visualizing various types of information relating to making work travel more efficient is provided to the user. At this time, the data visualization unit 90d can use the map data stored in the map database 90j to generate graphical information obtained by diagramming travel behavior and work behavior on a macro or micro scale, using the map as a base. In this embodiment, the data input/output unit 9a is constructed as a Web server. The Web server uses a communication protocol known as HTTP (Hyper Text Transfer Protocol) to perform transmission and reception of data to and from a Web browser installed in the first control unit C1. In order to exchange data with each other, a document written in HTML (Hyper Text Markup Language), XML (Extensible Markup Language) or the like is used, and the document can further include an image and/or a sound or voice, as well as a program for further performing some kind of processing.

A graphical image can be easily handled with an HTML file or an XML file. FIG. 7 shows an example of a work travel evaluation screen displayed on the display unit 62 by a Web browser including the data input/output unit 60a of the first control unit C1. Note that the content displayed in the display unit 62 can be displayed on the screen of a tablet-type computer or smartphone mounted on the mounting unit 3A as well. The top screen of the agricultural work evaluation screen is a map of a region including many agricultural lands bordered by embankments. The agricultural lands are distinguished by color, and the details thereof can be changed by selection. With a first selection, color is used to divide the agricultural lands into agricultural lands in which harvesting work is complete and agricultural lands in which harvesting work is not complete. With a second selection, color is used to divide the agricultural lands into agricultural lands in which a target harvest amount has been reached or exceeded, and agricultural lands in which a target harvest amount has not been reached.

Furthermore, the top screen as shown in FIG. 7 furthermore displays icons indicating the current positions of multiple combines 1 registered in the agricultural work management center. A sub-window is displayed in which by clicking a specific combine, information regarding that combine 1 and the combine work carried out by that combine are displayed. In this embodiment, a sub-window includes the machine number, machine position, worker name, work status, hour meter, fuel consumption amount, fuel cost, remaining fuel amount, work time, ratio between area worked and area not worked, engine set rotation speed, maximum water temperature, average work speed, and work efficiency level which is determined based on the preceding values, of the combine 1. This kind of agricultural work vehicle information related to such combine works is sent from the first control unit C1 of the combine 1 to the management computer system C3 so as to be processed, and is stored in real-time in the database server 6.

FIG. 8 shows an example of an agricultural work evaluation screen displayed on the display unit 62. The top screen of the agricultural work evaluation screen also is a map of the region including many agricultural lands bordered by embankments. The top screen shows a sub-window that, responsive to a specific agricultural land being clicked, displays agricultural land information and agricultural work item information relating to that agricultural land, and furthermore displays the agricultural work vehicle information as an option. Here, the agricultural land information includes the agricultural land name, area, crop, work progress, fertilizer (type and amount thereof) and agricultural chemicals (type and amount thereof); and the agricultural crop information includes a dehulled rice harvest amount, average protein, and average moisture. Note that the agricultural work vehicle information includes the fuel consumed, work time, engine set rotation speed, maximum water temperature and average work speed. The agricultural work vehicle information is sent from the first control unit C1 mounted on the combine 1 to the management computer system C3 relating to the agricultural work, and is stored in the database server 6.

Figure 9:
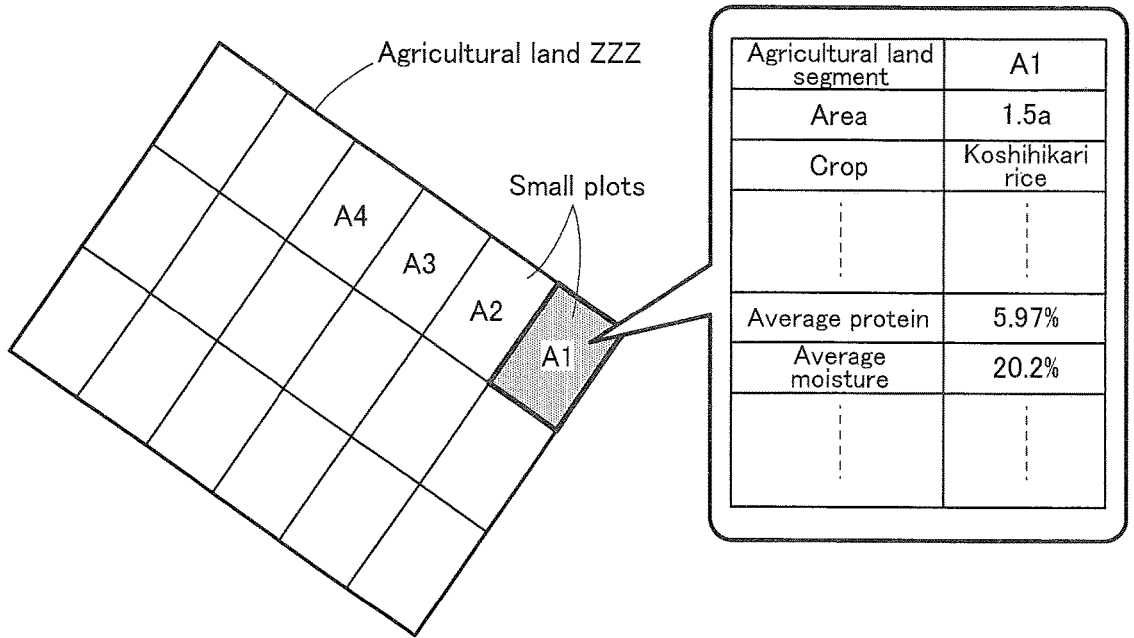
FIG. 9 is a diagram of a screen displayed on a display, in which agricultural work evaluation data has been made into a table in units of small plots in an agricultural land surrounded by embankments.

FIG. 9 shows a specific agricultural land ZZZ selected out of many agricultural lands shown on the top screen in FIG. 8, and the agricultural land ZZZ is constituted by many small plots obtained by dividing the agricultural land ZZZ by a predetermined size. That is to say, the entire region shown on the top screen in FIG. 8 corresponds to a specific agricultural land ZZZ selected in FIG. 9, and the many agricultural lands on the top screen in FIG. 8 correspond to the small plots as shown in FIG. 9. Accordingly, by clicking on a specific small plot A1 on the screen as shown in FIG. 9, the agricultural land information and agricultural crop information relating to that small plot A1 are displayed. Based on this information, precise agricultural work management is possible. Furthermore, the present invention can be applied not only to a crawler-type culm-head charging type combine, but also to a normal type (whole-culm charging type) combine and to a wheel-type combine.

Next, basic structures of a ground work vehicle and a ground work vehicle management system according to a second embodiment of the present invention, and in particular, a basic configuration for information display performed in cooperation between the ground work vehicle and the mobile communication terminal, will be described with reference to FIGS. 10, 11, and 12.

Examples of the ground work vehicle 1 include agricultural work vehicles such as a combine, a rice planter or a tractor, and construction work vehicles such as a bucket loader or a backhoe. The ground work vehicle 1 used in this invention includes, as the first control unit C1, a travel control ECU (electronic control unit) 3, a work apparatus ECU 4, a display information management modules 5 and a display unit 62. The display unit 62 is composed of a display control unit 62a and a vehicle-mounted display 62b. The constituent elements of the control system of the data input/output unit 60a are connected to each other via a data transfer line such as a vehicle-mounted LAN. Examples of mobile communication terminals C2 that cooperate with the ground work vehicle 1 regarding information display include laptop PCs, tablet PCs, mobile phones (especially smartphones) and the like that have a function of being able to exchange data with the ground work vehicle 1 via Wi-Fi or Bluetooth (registered trademark), and a function of being able to exchange data with a remotely-located management center 9 via a telephone line, or via a WAN such as the Internet. In addition to functional units that are conventionally included such as a display control unit 63, a display 64, a data input/output unit 60b, a line communication unit 65, and an owner ID management unit 7, the mobile communication terminal that functions as the second control unit C2 in this embodiment includes a display information management module 8 that is substantially realized by a program (the mobile communication terminal will hereinafter be denoted by reference mark "C2"). The data input/output unit 60a of the ground work vehicle 1 and the data input/output unit 60b the mobile communication terminal C2 are communication units that can perform relatively close-distance communication, or more preferably, wireless communication, such as Wi-Fi or Bluetooth (registered trademark).

The travel control ECU 3 of the ground work vehicle 1 is an ECU that deals with various types of control information relating to vehicle travel, and for example, includes a travel information generation unit 31 that converts, into travel information, the data such as the travel speed, engine rotation speed, travel distance and fuel efficiency which are obtained via the vehicle-mounted LAN. The work apparatus ECU 4 is an ECU that controls a mounted ground work apparatus, and includes a work information generation unit 41 that converts, into the ground work information, the data indicating the operation state and running state of the ground work apparatus. Since some work information is created by the management center 9 or the like other than the ground work vehicle 1, if it is necessary to make a distinction between the two, the work information generated by the work information generation unit 41 will be referred to as "internally-generated work information".

The display information management module 5 converts the information that is to be notified to the driver into display data, and displays that information on the vehicle-mounted display 62b or on the display 64 at the mobile communication terminal C2. Note that in addition to the internally-generated work information generated by the work information generation unit 41, the work information dealt with by the display information management module 5 also includes externally-generated work information that is received from the management center 9 by being relayed by the mobile communication terminal C2. For this reason, the display information management module 5 includes a first display data generation unit 51, a second display data generation unit 52, a third display data generation unit 53, and a fourth display data generation unit 54. From the internally-generated work information, the first display data generation unit 51 generates first display data to be displayed on the vehicle-mounted display 62b. From the internally-generated work information, the second display data generation unit 52 generates second display data to be displayed on the display 64 of the mobile communication terminal C2. From the externally-generated work information, the third display data generation unit 53 generates third display data to be displayed on the vehicle-mounted display 62b. Furthermore, from the externally-generated work information, the fourth display data generation unit 54 generates fourth display data to be displayed on the display 64 of the mobile communication terminal C2.

That is to say, the display information management module 5 receives the internally-generated work information and the externally-generated work information, and divides each information based on its content into the information that is to be displayed on the vehicle-mounted display 62b and information that is to be displayed on the display 64 of the mobile communication terminal C2. The display information management module 5 thus generates the first display data, the second display data, the third display data and the fourth display data, which are to be displayed in modes appropriate for the display property each of the vehicle-mounted display 62b and the display 64. Of course, depending on the case, the content displayed on the vehicle-mounted display 62b and the content displayed on the display 64 of the mobile communication terminal C2 may be redundant, and may be exactly the same.

Figure 10:
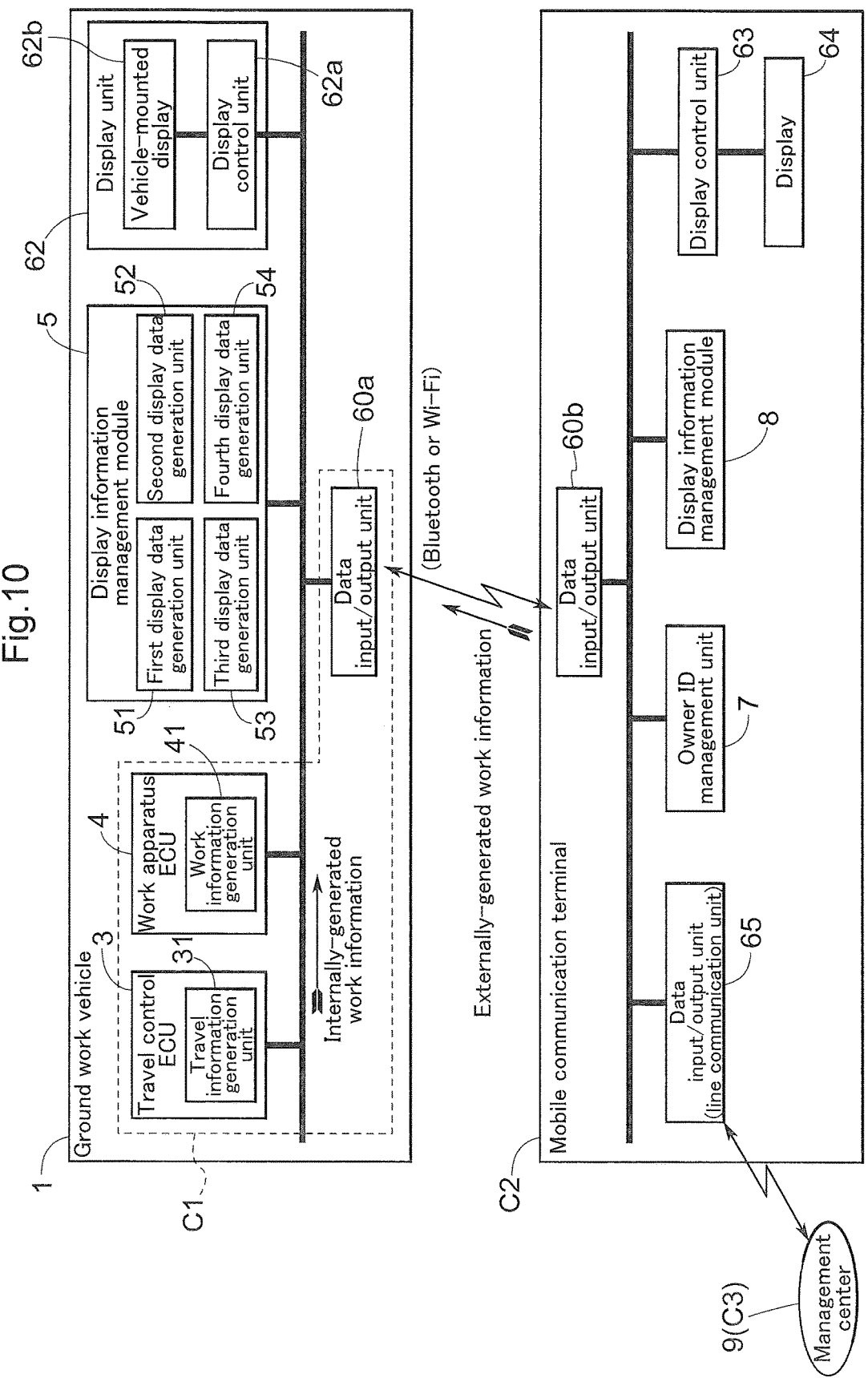
FIG. 10 is a schematic diagram showing one basic configuration for information display performed in cooperation between a ground work vehicle and a mobile communication terminal according to the present invention.

With the basic configuration as shown in FIG. 10, the display information management module 8 of the mobile communication terminal C2 has only a function of transferring, to the display control unit 63, the second and fourth data sent via the data input/output unit 60a of the ground work vehicle 1 and the data input/output unit 60b of the mobile communication terminal C2, and causing the second display data and fourth display data to be displayed on the display 64 of the mobile communication terminal C2. For this reason, the processing proficiency required by the mobile communication terminal C2 with regard to the present invention may be relatively low.

Figure 11:
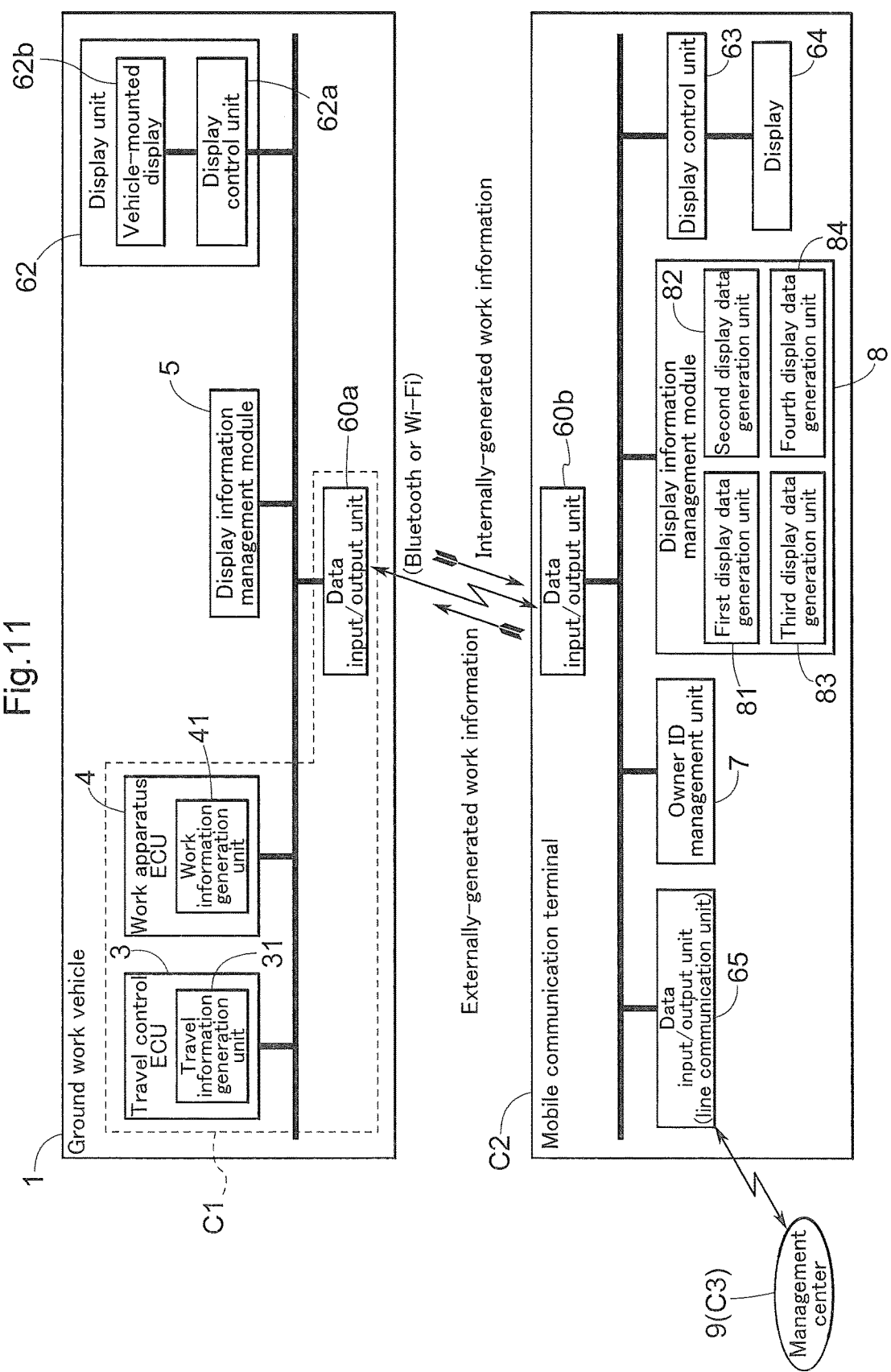
FIG. 11 is a schematic diagram showing another basic configuration for information display performed in cooperation between a ground work vehicle and a mobile communication terminal according to the present invention.

Next, the basic configuration as shown in FIG. 11 will be described. This basic configuration differs from the basic configuration as shown in FIG. 10 in that the functions of the display information management module 5 of the ground work vehicle 1 and the display information management module 8 of the mobile communication terminal C2 are different. The remaining parts of the configuration are substantially the same, and therefore only the parts thereof that are different from the foregoing configuration will be described below.

With the basic configuration as shown in FIG. 11, the function of the display information management module 5 of the ground work vehicle 1 and the function of the display information management module 8 of the mobile communication terminal C2 are the inverse of those in the basic configuration as shown in FIG. 10. In other words, the display information management module 8 includes the first display data generation unit 81, the second display data generation unit 82, the third display data generation unit 83, and the fourth display data generation unit 84. From the internally-generated work information sent from the display information management module 5 of the ground work vehicle 1, the first display information generation unit 81 generates the first display data to be displayed on the vehicle-mounted display 62b. From the internally-generated work information, the second display data generation unit 82 generates the second display data to be displayed on the display 64 of the mobile communication terminal C2. From the externally-generated work information sent from the management center 9, the third display data generation unit 83 generates the third display data (external display data) to be displayed on the vehicle-mounted display 62b. From the externally-generated work information, the fourth display data generation unit 84 generates the fourth display data (internal display data) to be displayed on the display 64 of the mobile communication terminal C2 (display of the mobile communication terminal).

That is to say, the display information management module 8 of the mobile communication terminal C2 receives the externally-generated work information and the internally-generated work information and divides each information based on the content thereof into information that is to be displayed on the display 64 of the mobile communication terminal C2 and information that is to be displayed on the vehicle-mounted display 62b. The display information management module 8 generates the first display data, the second display data, the third display data, and the fourth display data such that they are displayed in modes appropriate for the display property each of the display 64 and the vehicle-mounted display 62b. Of course, in this configuration as well, depending on the case, the content displayed by the vehicle-mounted display 62b and the content displayed by the display 64 of the mobile communication terminal C2 may be redundant, and may be exactly the same.

With the basic configuration as shown in FIG. 11, the display information management module 5 of the ground work vehicle 1 has only a function of causing the second display data and the fourth display data, which have been sorted and transferred by the display information management module 8 of the mobile communication terminal C2, to be displayed on the vehicle-mounted display 62b. Of course, if the mobile communication terminal C2 is not connected to the ground work vehicle 1, the display information management module 5 of the ground work vehicle 1 has a function of causing the internally-generated work information to be displayed on the vehicle-mounted display 62b. For this reason, the processing proficiency required by the display information management module 5 of the ground work vehicle 1 may be relatively low, but the display information management module 8 of the mobile communication terminal C2 requires a processing proficiency that is higher than that of the display information management module 5.

Figure 12:
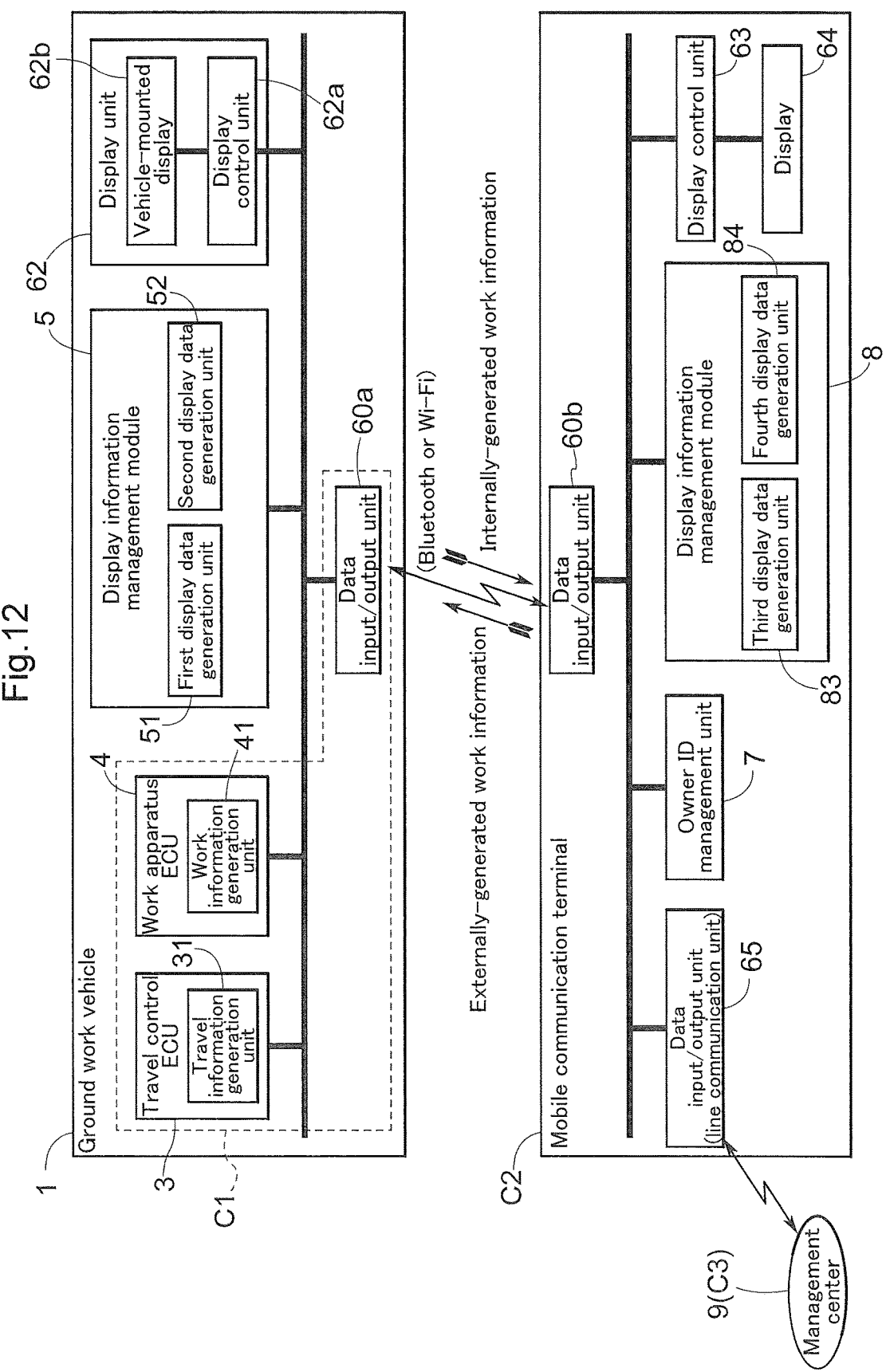
FIG. 12 is a schematic diagram showing yet another basic configuration for information display performed in cooperation between a ground work vehicle and a mobile communication terminal according to the present invention.

Furthermore, FIG. 12 shows a configuration in which the two basic configurations as shown in FIGS. 10 and 11 have been mixed. That is to say, in this basic configuration, the display information management module 5 of the ground work vehicle 1 determines the sorting of the internally-generated work information, and the display information management module 8 of the mobile communication terminal C2 determines the sorting of the externally-generated work information. Accordingly, the display information management module 5 of the ground work vehicle 1 includes the first display data generation unit 51 that generates the first display data to be displayed on the vehicle-mounted display 62b based on the internally-generation work information, and the second display data generation unit 52 that generates the second display data to be displayed on the display 64 of the mobile communication terminal C2 based on the internally-generated work information. On the other hand, the display information management module 8 of the mobile communication terminal C2 includes the third display data generation unit 83 that generates the third display data (external display data) for causing the vehicle-mounted display 62b to perform display based on the externally-generated work information sent from the management center 9, and the fourth display data generation unit 84 that generates the fourth display data (internal display data) for causing the display 64 of the mobile communication terminal C2 (display of the mobile communication terminal) to perform display based on the externally-generated work information.

Next, one specific embodiment of the combine 1 serving as the ground work vehicle according to the present invention and the mobile communication terminal C2 that cooperates with the combine 1 will be described. Herein, the combine 1 is a combine such as one as shown in FIG. 5, and the mobile communication terminal C2 is a smartphone, which is a mobile communication terminal having a telephone function, a Wi-Fi function, and an application execution function (in the following description, the smartphone will be denoted by reference mark "C2").

The smartphone C2 is equipped on the body of the driver, but it is also possible for it to be mounted on a cradle provided at the driver's seat 16. Various functions needed for realizing the present invention are installed on the smartphone C2 each as an application. The smartphone C2 can use typically-included functions thereof to connect via a mobile phone communication line and the Internet to the management computer system C3 of the management center 9 so as to be able to exchange data therewith, and can use a wireless communication protocol such as Wi-Fi to connect to the ECU (electronic control unit) mounted on the combine 1 so as to be able to exchange data therewith.

Figure 13:
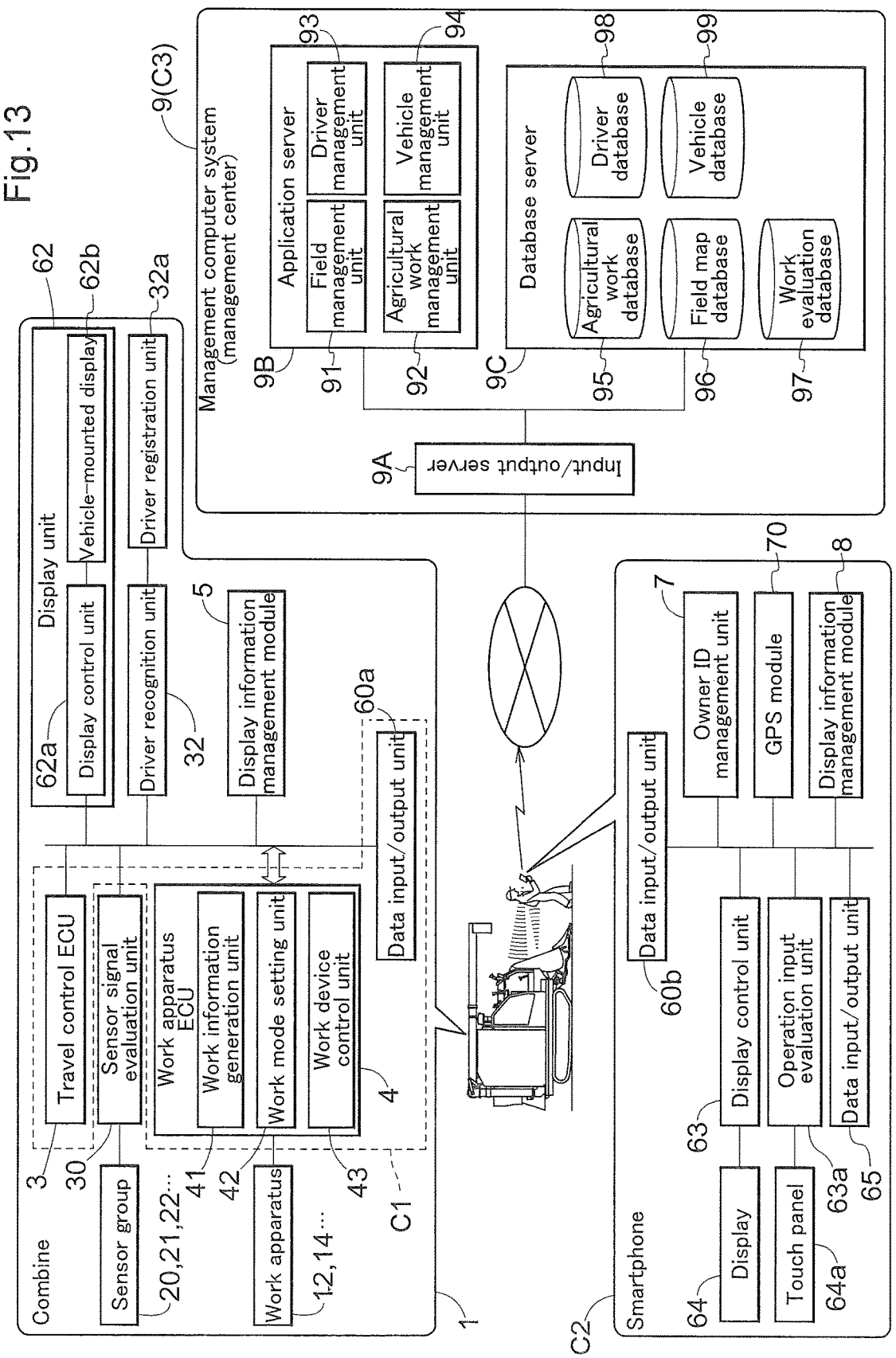
FIG. 13 is a functional block diagram showing functional units relating to the present invention, which are constructed in a combine, a smartphone, and a management center.

FIG. 13 shows functional block units that indicate functions relating to the present invention in particular, which are included in the combine 1, the smartphone C2, and the management computer system C3 of the management center 9. Note that the basic configuration relating to the present invention, which is included in the combine 1 and the smartphone C2 according to this specific embodiment, uses the basic configuration as shown in FIG. 10. Accordingly, content that is redundant with the description given with reference to FIG. 10 will not be described here.

In addition to the travel control ECU 3, the work apparatus ECU 4, the display information management module 5, the data input/output unit 60a and the display control unit 62a which are included in the above-described basic configuration, the combine 1 includes a sensor signal evaluation unit 30, a driver recognition unit 32 and a driver registration unit 32a. The configurations of the travel control ECU 3 and the display information management module 5 are the same as those in the basic configuration as shown in FIG. 10, but in addition to the work information generation unit 41, the work apparatus ECU 4 also includes a work mode setting unit 42 and a work apparatus control unit 43. The work mode setting unit 42 sets the work mode of the agricultural work that is to be subsequently performed by the combine 1. The work modes include setting parameters for many work apparatuses, and therefore the work mode setting unit 42 provides the parameters of the work apparatus for creating a specific work mode to the work device control unit 43. The work device control unit 43 adjusts the work apparatus so as to match the work mode to be carried out based on the provided parameters of the work apparatus. Various types of information relating to the setting of the work mode can be included in the internally-generated work information generated by the work information generation unit 41.

As a further added function, the work apparatus ECU 4 has a device monitoring function of monitoring the states of various devices equipped in the combine 1, detecting sensor malfunctions, hydraulic pressure malfunctions, operation errors and the like, for example, and outputting a necessary instruction. Accordingly, the internally-generated work information generated by the work information generation unit 41 includes malfunctions detected using an apparatus monitoring function. Furthermore, information such as advice for resolving such malfunctions and correct operation procedures can also be included in the internally-generated work information. Various types of information relating to the setting of the work mode, information such as advice for resolving a malfunction and correct operation procedures and the like such as those described above are treated as operation state data of the ground work apparatus to be displayed to the driver.

Furthermore, the work apparatus ECU 4 can also receive the vehicle travel state data, which is the travel information generated by the travel information generation unit 31 of the travel control ECU 3, and provide the vehicle travel state data to the display information management module 5 as the internally-generated work information.

The sensor signal evaluation unit 30 is connected to various sensors, including the harvest amount sensor 25 and the taste analyzer 26, and transmits various types of measurement data to the functional units that need them. The driver recognition unit 32 recognizes the driver onboard of the combine 1 based on ID information in the smartphone C2 that is sent from the smartphone C2. Information relating to a recognized driver, for example, the experience level of operating the combine 1, can be read out from the driver registration unit 32a. Based on the information regarding the driver, the display information management module 5 can determine the content to be displayed on one or both of the vehicle-mounted display 62b and the display 64 of the smartphone C2, based on the internally-generated work information and the externally-generated work information.

The smartphone C2 includes a GPS module 70, a data input/output unit 65, a data input/output unit 60b, a display control unit 63, an operation input evaluation unit 63a and the like. Since the GPS module 70 has a function of measuring absolute position in latitude and longitude using the principle of a global positioning system, the position of smartphone C2 on the map, or in other words, the position of the combine 1 on the map substantially can be obtained using positioning data. The GPS module 70 is built into a car navigation system as well, and therefore a configuration is possible in which, in the case where a car navigation system is mounted on the combine 1 and connected to an ECU, the combine position is acquired from the combine 1. The operation input evaluation unit 56 evaluates an operation input using a touch panel 64a and outputs an operation command.

The management computer system C3 of the management system 9 includes an input/output server 9A serving as a data input/output unit, an application server 9B serving as the application execution module, and a database server 9C serving as the database module. The input/output server 9A includes a data input processing function of transferring data received from the smartphone C2 to the application server 9B and the database server 9C, and a data output function of transmitting data generated by the application server 9B and data extracted from the databased server 9C to the smartphone C2. In this embodiment, the input/output server 9A is configured as a Web server. Note that the input/output server 9A, the application server 9B and the database server 9C may be a decentralized or virtualized computer system such as a cloud computer system, rather than being included in one integrated computer system.

A field management unit 91, an agricultural work management unit 92, a driver management unit 93, and a vehicle management unit 94 are configured by software in the application server 9B. In cooperation with the database server 9C, the field management unit 91 manages field information, which is information relating to a field, such as the field number, field name, field address, field map position, field shape, field area, field crop type and the like, based on information input from a farmhouse, an agricultural association or the like. In cooperation with the database server 9C, the agricultural work management unit 92 manages agricultural work information, which is information relating to agricultural work for each field, such as rice planting, weeding, spraying of agricultural chemicals, fertilizing, reaping and the like, which is sent mainly from an agricultural work vehicle such as a combine, or from the smartphone C2 of a worker using the agricultural work vehicle. In cooperation with the database server 9C, the driver management unit 93 manages information relating to a driver of the combine 1 who is registered in the management center 9. Examples of this information include name, address, experience level and the like. In cooperation with the database server 9C, the vehicle management unit 94 manages information on a combine 1 that is registered in the management center 9. Examples of this information include the type, travel history, work history, malfunction history and the like of the combine 1.

In this embodiment, the database server 9C includes an agricultural work database 95, a field map database 96, a work evaluation database 97, a driver database 98 and a vehicle database 99 as databases that relate in particular to the present invention. The agricultural work database 95 stores the above-described field information and agricultural work information. Note that the agricultural work information includes data indicating the combine 1 (in the present embodiment, a registered work mode which is the set work mode for the registered combine 1). The field map database 96 stores a map of the field linked to the field number, map position and the like, and can extract and output map data associated with the field and its periphery, using the field number and field map position as search conditions. The work evaluation database 97 causes the evaluation information sent from the combine 1 via the smartphone C2 to be linked with the field information and stores that information. The evaluation information is stored along with past data for each field, and therefore it can also be used to perform successive (over time) evaluation of the same field. The driver database 98 stores various types of information relating to a registered driver, and the vehicle database 99 stores various types of information relating to a registered combine 1.

Accordingly, the externally-generated work information sent from the management computer system C3 of the management center 9 also includes past ground work result data for a target ground work site, ground work target data determined by an external apparatus and the like. Furthermore, information such as the type of the ground work (tilling work, agricultural crop harvesting work, rice planting work, etc.), properties of the ground work site (marshland, inclined ground, etc.), environment of the ground work site (windy, rainy, arid, etc.) can be included as ground work attribute information in the externally-generated work information sent from the management computer system C3 of the management center 9. Accordingly, based on the received ground work attribute information, the display information management module 5 can extract the information that is to be displayed on the vehicle-mounted display 62b (first display data, third display data) and the information that is to be displayed on the display 64 of the smartphone C2 (second display data, fourth display data) from the externally-generated work information and the internally-generated work information.

Based on the signal reception strength between the combine 1 and the smartphone C2, or position data from the GPS module 70 of the smartphone C2 and position data of the combine 1, it is possible for the combine to determine that the driver has moved away from the driving cabin 13, and for example, is outside of the combine 1. If a car navigation system is mounted on the combine 1, the position of the combine 1 can be obtained from the car navigation system, and it is also possible to use the position data from the GPS module 70 of the smartphone C2 during traveling as the position of the combine 1. Accordingly, the display information management module 5 can select information that is to be displayed on the display 64 of the smartphone C2 (second display data, fourth display data) based on the location of the smartphone C2. In particular, when it is determined that the driver is outside of the combine 1, all of the information that is to be provided to the driver can also be displayed on the display 64 of the smartphone C2.

Figure 14:
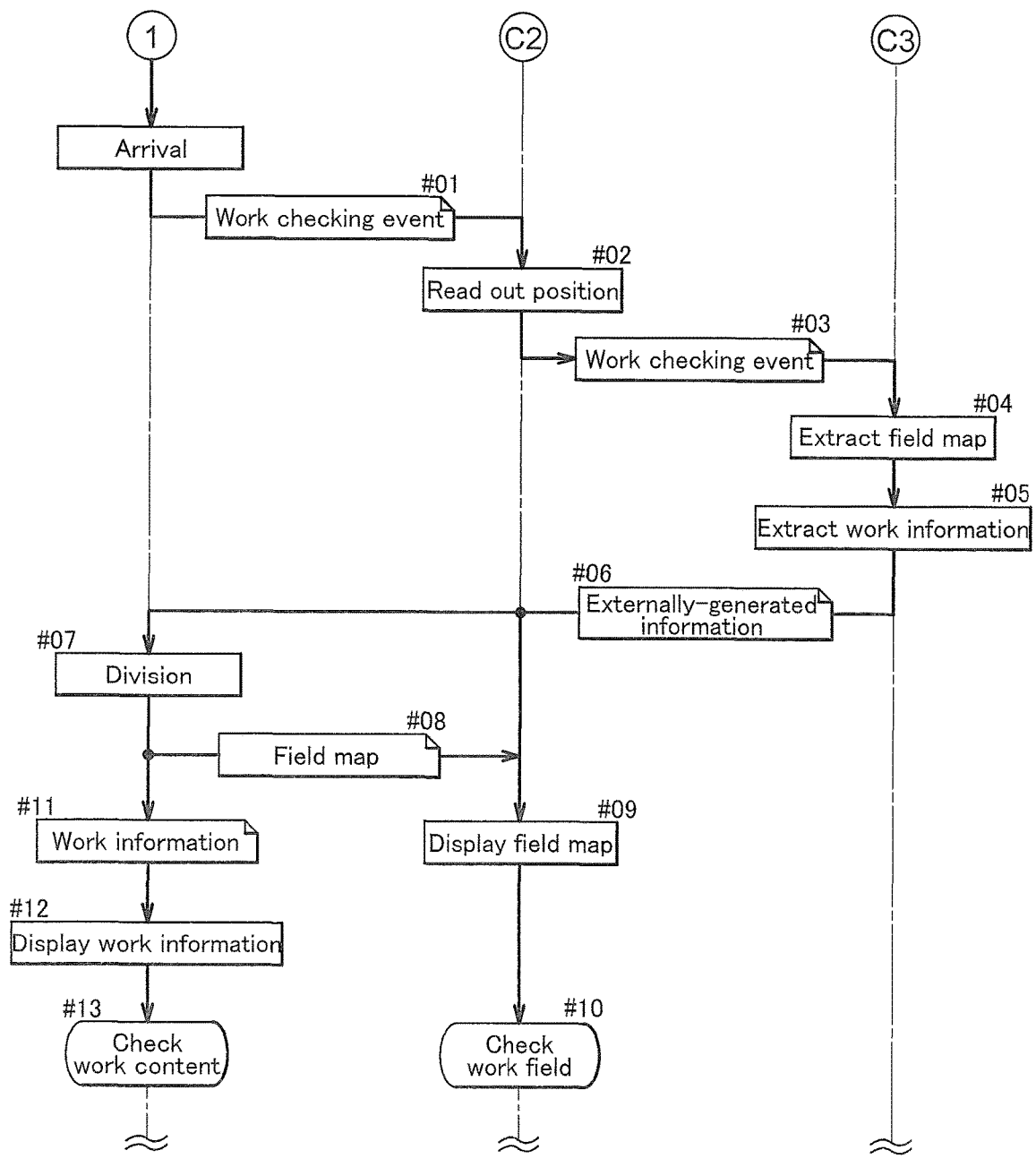
FIG. 14 is a flowchart showing a flow of data among a combine, a smartphone and a management center.

Next, with reference to the flowcharts as shown in FIGS. 14 and 15, the flow of data among the combine 1, the smartphone C2 and the management computer system C3 will be described using a simple example.

First, a flow for control at the time of checking the field in which work is to be performed and the work content will be described with reference to FIG. 14.

When the combine 1 arrives at the vicinity of the field in which work is to be performed, a work checking event occurs in the work apparatus ECU 4 based on the input of an operation by the worker, and the work checking event is sent to the smartphone C2 (#01). After receiving the work checking event, the smartphone C2 reads out the positioning data (longitude, latitude), which indicates the current position, from the GPS module 70 (#02), incorporates it into the work checking event, and transmits it to the management computer system C3 of the management center 9 (#03). In the management computer system C3, in response to the received work checking event, the field management unit 91 extracts the field map of the field corresponding to the positioning data from the field map database 96 (#04) and extracts the work information for that field from the work database 95 (#05). The extracted field map and work information are sent as the externally-generated work information (#06). The externally-generated work information is transferred to the display information management module 5 of the combine 1 via the smartphone C2 (#07).

The display information management module 5 of the combine 1 performs division on the externally-generated work information that is received (#08). The field map (fourth display data) extracted from the externally-generated work information is sent to the smartphone C2, and the display information management module 8 of the smartphone C2 causes the received field map to be displayed on the display 64 (#09). The field map displayed on the display 64 can be scaled up and down using standard functions of the smartphone C2, so that the driver can easily check the field in which work is to be performed (#10).

The display information management module 5 of the combine 1 furthermore extracts the work information from the received externally-generated work information (#11) and causes the work information (third display data) to be displayed on the vehicle-mounted display 62b (#12). The display screen of the vehicle-mounted display 62b displays work content such as rice harvesting work, cutting height and the like, and therefore the driver can easily check the work content and set the cutting height and the like using the display screen (#13).

Next, a flow for control when the work load exceeds a threshold will be described with reference to FIG. 15. In this example, it is assumed that an increase in the threshing load, acting as the work load, has occurred.

If an increase in the threshing load occurs during harvesting work performed by the combine, a threshing load increase event occurs in the work apparatus ECU 4 (#21). Based on the occurrence of this threshing load increase event, the work information generation unit 41 generates threshing load information relating to the threshing load that has occurred (#22). For example, the threshing load information includes warning data and threshing load detail data. The threshing load detail data contains the threshing rotation speed, travel speed, a measure for reducing the threshing load and the like. The threshing load information is provided to the display information management module 5 as the internally-generated work information, and is divided into warning display data (first display data) that is to be displayed on the vehicle-mounted display 62b of the combine 1 and threshing load detail data (second display data) that is to be sent to the smartphone C2 (#23). Based on the warning display data, the vehicle-mounted display 62b of the combine 1 displays a warning indicating an increase in the threshing load (#24). Also, based on the threshing load detail data, the display 64 of the smartphone C2 uses a page-turning function of the smartphone C2 to display the threshing rotation speed, travel speed, and measures for reducing the threshing load (#25). The driver can check information relating to the increase in the threshing load that is currently occurring based on the details of the threshing load displayed on the display 64 of the smartphone C2 (#26) and can take the appropriate measures for reducing the load (#27).

As described above, with the present invention, display information including information relating to ground work can be displayed by dividing display between the vehicle-mounted display 62b arranged in the driving cabin 13, and the display 64 of the smartphone C2, which can be carried by and held in the hand of the driver, and an effective display for the driver is therefore realized.

The information displayed on the vehicle-mounted display 62b and the display 64 of the smartphone C2 was work information and partial travel information, but other types of information, such as road information, news information, entertainment information and the like may be divided therebetween and displayed. If multiple vehicle-mounted displays 62b are included, display may be divided among the multiple vehicle-mounted displays 62b according to the display content.

In the above-described embodiment, a smartphone was used as the mobile communication terminal, but another mobile communication terminal such as a tablet-type PC, a laptop PC or a navigation device can be used.

INDUSTRIAL APPLICABILITY

The present invention can be applied not only to a harvester for harvesting crops such as rice, barley and corn, harvesting vegetables such as potatoes, carrots and radishes, harvesting fruit such as apples and mandarin oranges and the like, but also to an agricultural work vehicle used for various kind of agricultural work such as tractors, rice planters, fertilizer spreaders, agricultural chemical sprayers and grass mowers, and further to a construction vehicle used for a civil engineering work such as front-loaders.

DESCRIPTION OF REFERENCE NUMERALS/MARKS

1 Ground work vehicle (agricultural work vehicle, combine)
1a Work unit
10A Travel operation device
10B Work operation device
23 GPS module
31 Travel information generation unit
32 Work information generation unit
33 Information management unit (data link unit)
34 Data input/output unit (Web browser)
35 Fuel efficiency information generation unit
4 Work apparatus ECU
41 Work information generation unit
60a Data input unit
60b Data output unit
5 Display information management module
51 First display data generation unit
52 Second display data generation unit
53 Third display data generation unit
54 Fourth display data generation unit
62 Vehicle-mounted display
64 Display of mobile communication device (mobile display)
8 Display information management module
81 First display data generation unit
82 Second display data generation unit
83 Third display data generation unit
84 Fourth display data generation unit
9 Management center
90a Data input unit
90b Data output unit
90c Travel evaluation unit
90d Data visualization unit
9a Data input/output unit (Web server)
9b Application execution module (application server)
9c Database module (database server)
C1 First control unit
C2 Second control unit
C3 Management computer system

What is claimed is:

1. A ground work vehicle having a vehicle-mounted display configured to display information, the ground work vehicle comprising:
a work information generation unit configured to generate internally-generated work information, which is information relating to ground work;
a data input unit configured to be able to exchange data with a mobile communication terminal carried by a driver;
a first display data generation unit configured to, based on the internally-generated work information, generate first display data to be displayed on the vehicle-mounted display;
a second display data generation unit configured to, based on the internally-generated work information, generate second display data to be displayed on a display of the mobile communication terminal; and
a third display data generation unit configured to generate third display data to be displayed on the vehicle-mounted display, based on externally-generated work information relating to ground work, which is generated by a remotely-located management center and is acquired by the data input/output unit using the mobile communication terminal as a relay.

2. The ground work vehicle according to claim 1, further comprising:
a fourth display data generation unit configured to, based on the externally-generated work information, generate fourth display data to be displayed on the display of the mobile communication terminal.

3. The ground work vehicle according to claim 1, further comprising:
a driver recognition unit configured to recognize the driver based on ID information of a mobile communication terminal connected via the data input/output unit so as to be able to transfer data,
wherein display content on one or both of the vehicle-mounted display or the display of the mobile communication terminal is changed based on registration information of the recognized driver.

4. The ground work vehicle according to claim 1, wherein the internally-generated work information includes one or both of operation state data for the equipped ground work apparatus and the vehicle travel state data, and the externally-generated work information includes one or both of past ground work result data for a target ground work site and ground work target data determined by an external apparatus.

5. The ground work vehicle according to claim 1, wherein content included in the first display data and content included in the second display data are extracted from the internally-generated work information based on ground work attribute information that includes a ground work type, a ground work site property, a ground work site environment and the like.

6. The ground work vehicle according to claim 1, wherein content of display data sent to the mobile communication terminal is changed based on a location of the mobile communication terminal.

7. A ground work information display program installed in a mobile communication terminal configured such that data can be transferred between the mobile communication terminal and a data input/output unit of a ground work vehicle having a vehicle-mounted display configured to display information, the ground work information display program being configured to cause a computer to realize:

an internal display data generation function according to which internal display data to be displayed on a display of the mobile communication terminal is generated based on externally-generated work information relating to ground work, which is generated by a remotely-located management center and is received via a data communication line;

an external display data generation function according to which external display data to be displayed on the vehicle-mounted display is generated based on the externally-generated work information; and a function according to which the external display data are transmitted to the data input/output unit.

8. The ground work information display program according to claim 7, furthermore configured to cause a computer to execute:

a function according to which display data to be displayed on the display of the mobile communication terminal is generated based on internally-generated work information relating to ground work, which is generated by the ground work vehicle and is sent from the ground work vehicle.

9. The ground work information display program according to claim 8, wherein the internally-generated work information includes one or both of operation state data for the equipped ground work apparatus and the vehicle travel state data, and the externally-generated work information includes one or both of past ground work result data for a target ground work site and ground work target data determined by an external apparatus.

10. The ground work information display program according to claim 7, wherein display content on one or both of the vehicle-mounted display and the display of the mobile communication terminal is changed based on registered information on an owner, which is obtained by inquiry of the ground work vehicle or the management center using internally-stored ID information of the owner.

11. A storage medium storing a ground work information display program installed in a mobile communication terminal configured such that data can be transferred between the mobile communication terminal and a data input/output unit of a ground work vehicle having a vehicle-mounted display configured to display information, the storage medium storing an agricultural work management program configured to cause a computer to execute:

an internal display data generation function according to which internal display data to be displayed on a display is generated based on externally-generated work information relating to ground work, which is generated by a remotely-located management center and is received via a data communication line;

an external display data generation function according to which external display data to be displayed on the vehicle-mounted display is generated based on the externally-generated work information; and a function according to which the external display data are transmitted to the data input/output unit.

12. A ground work information display method performed using a mobile communication terminal configured such that data transfer is possible between the mobile communication terminal and a data input/output unit of a ground work vehicle having a vehicle-mounted display configured to display information, the ground work information display method comprising:

an internal display data generation step of generating internal display data to be displayed on a display of the mobile communication terminal, based on externally-generated work information relating to ground work, which is generated at a remotely-located management center and is received via a data communication line;

an external display data generation step of generating external display data to be displayed on the vehicle-mounted display, based on the externally-generated work information; and a step of transmitting the external display data to the data input/output unit.

* * * * *